United States Patent
Kim et al.

(10) Patent No.: US 11,600,811 B2
(45) Date of Patent: Mar. 7, 2023

(54) PROTECTIVE LAYER FOR PROTECTING LITHIUM METAL NEGATIVE ELECTRODE FOR LITHIUM SECONDARY BATTERY, PRODUCTION METHOD THEREOF, AND LITHIUM SECONDARY BATTERY INCLUDING THE SAME

(71) Applicant: Research & Business Foundation Sungkyunkwan University, Suwon-si (KR)

(72) Inventors: Duk Joon Kim, Seoul (KR); Anh Le Mong, Suwon-si (KR); Hyung Joon Jeon, Suwon-si (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 304 days.

(21) Appl. No.: 17/008,950

(22) Filed: Sep. 1, 2020

(65) Prior Publication Data
US 2021/0288310 A1  Sep. 16, 2021

(30) Foreign Application Priority Data
Mar. 16, 2020 (KR) .................. 10-2020-0031937

(51) Int. Cl.
*H01M 4/134* (2010.01)
*H01M 4/36* (2006.01)
(Continued)

(52) U.S. Cl.
CPC ........ *H01M 4/134* (2013.01); *C08G 75/0245* (2013.01); *H01M 4/366* (2013.01);
(Continued)

(58) Field of Classification Search
None
See application file for complete search history.

(56) References Cited

FOREIGN PATENT DOCUMENTS

KR      10-2055265 B1    12/2019

OTHER PUBLICATIONS

Machine translation of Korean Patent Publication No. 10-2055265 (Year: 2019).*

(Continued)

*Primary Examiner* — Wyatt P McConnell
(74) *Attorney, Agent, or Firm* — NSIP Law

(57) ABSTRACT

Disclosed is a protective layer to protect a lithium metal negative electrode for a lithium secondary battery, in which the protective layer may inhibit formation of lithium dendrite and improve thermal/chemical stability, and conductivity of lithium ions. Further, disclosed are a production method of the protective layer, and a lithium secondary battery including the protectively layer. The protective layer contains a poly(arylene ether sulfone)-poly(ethylene glycol) graft copolymer represented by a following Chemical Formula 1:

[Chemical Formula 1]

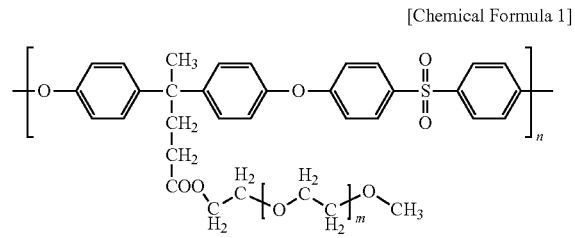

where, in the Chemical Formula 1, n is an integer of 60 to 80, and m is an integer of 40 to 45.

14 Claims, 22 Drawing Sheets

(51) Int. Cl.
    *H01M 10/0569*     (2010.01)
    *C08G 75/0245*     (2016.01)
    *H01M 10/0525*     (2010.01)
    *H01M 4/02*     (2006.01)

(52) U.S. Cl.
    CPC ... *H01M 10/0525* (2013.01); *H01M 10/0569* (2013.01); *H01M 2004/027* (2013.01)

(56) References Cited

OTHER PUBLICATIONS

Korean Office Action dated Jul. 9, 2021 in counterpart Korean Patent Application No. 10-2020-0031937 (5 pages in Korean).

\* cited by examiner

Li metal

Li in OLE

PROTECTIVE LAYER FOR PROTECTING LITHIUM METAL NEGATIVE ELECTRODE FOR LITHIUM SECONDARY BATTERY, PRODUCTION METHOD THEREOF, AND LITHIUM SECONDARY BATTERY INCLUDING THE SAME

CROSS REFERENCE TO RELATED APPLICATIONS

This application claims the benefit under 35 USC § 119(a) of Korean Patent Application No. 10-2020-0031937 filed on Mar. 16, 2020 in the Korean Intellectual Property Office, the entire disclosure of which is incorporated herein by reference for all purposes.

BACKGROUND

1. Field

The present disclosure relates to a protective layer to protect a lithium metal negative electrode for a lithium secondary battery, in which the protective layer may inhibit formation of lithium dendrite and improve thermal/chemical stability, and conductivity of lithium ions. Further, the present disclosure relates to a production method of the protective layer, and a lithium secondary battery including the protectively layer.

2. Description of Related Art

Lithium secondary batteries are used in various fields such as electronic devices and electric vehicles due to their long life, high energy density, and satisfaction of environmental regulations. In particular, lithium metal is attracting attention as an ideal cathode material for not only a lithium ion battery, but also a high energy battery such as a lithium sulfur battery and a lithium air battery, due to its high specific capacity (3860 mAh/g), light weight (0.53 g/cm$^3$), and low redox potential (−3.040 V).

However, commercialization of a lithium secondary battery system using the lithium metal negative-electrode is limited due to decomposition of liquid electrolytes and formation of dendrites, which cause low safety and low life.

During repeated charge/discharge cycle of the lithium secondary battery, irreversible reaction between the lithium metal and liquid electrolyte occurs due to high reactivity of the lithium metal. As a result, an unstable insoluble solid layer (SEI) is formed on the lithium metal surface, and the liquid electrolyte is dried.

The unstable insoluble solid layer (SEI) has a low tensile strength and therefore may not withstand a volume change of the lithium metal. Thus, uncontrolled growth of lithium dendrite may occur in an entire free space of a cell and then the dendrite may penetrate a separator, thereby lowering Coulombic efficiency (CE) of the cell, and causing a short circuit in the cell, thus causing overheating and fire.

In order to solve these problems, various studies have been conducted, such as development of salts, deposition of a protective layer on a lithium metal surface using a liquid electrolyte having additives and inorganic compounds, or polymers. Among these approaches, a protective layer approach may limit side reactions of the liquid electrolyte and the lithium metal due to a smaller contact area to improve the CE and may form a uniform distribution of lithium cations, thereby suppressing the growth of the lithium dendrites.

Thus, up to now, a research on the protective layer to protect the lithium metal negative electrode using poly (vinylidene fluoride) (PVDF), poly(methyl methacrylate) (PMMA), poly(dimethylsiloxane) (PDMS), polytetrafluoroethylene (PTFE), PVDF-HFP copolymer and PVDF/inorganic particle composites has been conducted. However, the conventional protective layer materials for protecting the lithium metal negative electrode may degrade battery performance due to high resistance thereof, may have very low chemical stability at an interface between the protective layer and the electrolyte, and may have low ion conductivity.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter.

One purpose of the present disclosure is to provide a method for synthesizing a poly(arylene ether sulfone)-poly (ethylene glycol) graft copolymer having excellent mechanical strength and ion conductivity.

Another purpose of the present disclosure is to provide a protective layer to protect a lithium metal negative electrode for a lithium secondary battery, in which the protective layer may inhibit lithium dendrites formation and improve thermal/chemical stability and conductivity of lithium ions, and to provide a production method thereof.

Another purpose of the present disclosure is to provide a lithium secondary battery including the protective layer for protecting the lithium metal negative electrode for the lithium secondary battery.

Purposes of the present disclosure are not limited to the above-mentioned purpose. Other purposes and advantages of the present disclosure as not mentioned above may be understood from following descriptions and more clearly understood from embodiments of the present disclosure. Further, it will be readily appreciated that the purposes and advantages of the present disclosure may be realized by features and combinations thereof as disclosed in the claims.

In a first aspect of the present disclosure, there is provided a method for synthesizing a poly(arylene ether sulfone)-poly (ethylene glycol) graft copolymer, the method comprising performing esterification reaction between a compound represented by a following Chemical Formula 1-1 and a compound represented a following Chemical Formula 1-2 to synthesize the poly(arylene ether sulfone)-poly(ethylene glycol) graft copolymer represented by a following Chemical Formula 1:

[Chemical Formula 1-1]

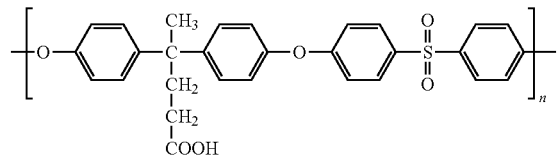

where, in the Chemical Formula 1-1, n is an integer of 60 to 80,

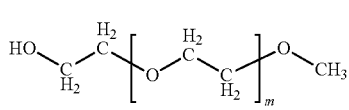

[Chemical Formula 1-2]

where, the Chemical Formula 1-2, m is an integer of 40 to 45,

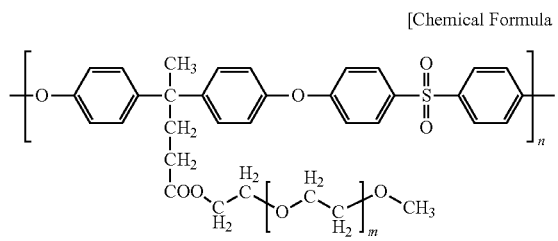

[Chemical Formula 1]

where, in the Chemical Formula 1, n is an integer of 60 to 80, and m is an integer of 40 to 45.

In one implementation of the first aspect, the esterification reaction is carried out under presence of 4-dimethylaminopyridine (DMAP) and N,N'-dicyclohexylcarbodiimide (DCC).

In one implementation of the first aspect, the esterification reaction is carried out at a temperature of 60 to 100° C. in a dimethylformamide (DMF) solvent.

In a second aspect of the present disclosure, there is provided a protective layer for protecting a lithium metal negative electrode for a lithium secondary battery, the protective layer containing a poly(arylene ether sulfone)-poly(ethylene glycol) graft copolymer represented by a following Chemical Formula 1:

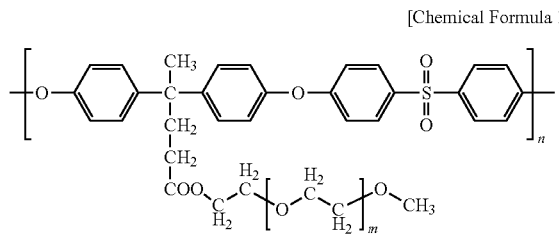

[Chemical Formula 1]

where, in the Chemical Formula 1, n is an integer of 60 to 80, and m is an integer of 40 to 45.

In one implementation of the second aspect, the protective layer is formed on a lithium metal surface, wherein an ion conductivity of the protective layer is $0.27 \times 10^{-3}$ S/cm or greater, wherein a liquid electrolyte uptake of the protective layer is 55% or greater.

In one implementation of the second aspect, the protective layer has a tensile strength of 2.0 MPa or greater and a break elongation of 60% or greater.

In one implementation of the second aspect, a thermal decomposition temperature (Td) of the protective layer is 200° C. or higher.

In one implementation of the second aspect, the liquid electrolyte contains: a lithium salt; and at least one organic solvent selected from ethylene carbonate (EC), acetonitrile (ACN) and diethyl carbonate (DEC).

In one implementation of the second aspect, the liquid electrolyte contains ethylene carbonate (EC), acetonitrile (ACN) and diethyl carbonate (DEC) as the organic solvent, wherein the liquid electrolyte contains ethylene carbonate (EC), acetonitrile (ACN) and diethyl carbonate (DEC) in a volume ratio of 3:3.5 to 4.5:2.5 to 3.5.

In one implementation of the second aspect, the lithium salt includes lithium bis(trifluoromethanesulfonyl) (LITFSI).

In a third aspect of the present disclosure, there is provided a method for producing a protective layer for protecting a lithium metal negative electrode for a lithium secondary battery, the method comprising: dissolving a poly(arylene ether sulfone)-poly(ethylene glycol) graft copolymer represented by a following Chemical Formula 1 into a solvent to prepare a first solution; and applying the first solution to a lithium metal surface under argon gas,

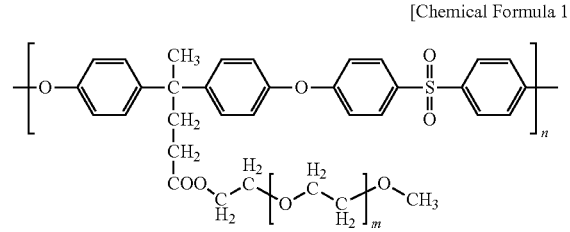

[Chemical Formula 1]

where, in the Chemical Formula 1, n is an integer of 60 to 80, and m is an integer of 40 to 45.

In one implementation of the third aspect, the solvent may include tetrahydrofuran (THF).

In a fourth aspect of the present disclosure, there is provided a lithium secondary battery comprising a positive-electrode; a negative-electrode; and liquid electrolyte, wherein the negative-electrode includes lithium metal, wherein the lithium secondary battery further comprises the protective layer as defined above formed on a surface of the lithium metal of the negative-electrode.

In one implementation of the fourth aspect, the liquid electrolyte contains: lithium bis(trifluoromethanesulfonyl) (LITFSI) as a lithium salt; and ethylene carbonate (EC), acetonitrile (ACN) and diethyl carbonate (DEC) as an organic solvent, wherein the liquid electrolyte contains ethylene carbonate (EC), acetonitrile (ACN) and diethyl carbonate (DEC) in a volume ratio of 3:3.5 to 4.5:2.5 to 3.5.

Effects of the present disclosure may be as follows but may not be limited thereto.

According to the present disclosure, the negative-electrode protective layer may be formed by coating a thin film of poly(arylene ether sulfone)-poly(ethylene glycol) graft copolymer (PAES-g-PEG) on a surface of the lithium metal. Thus, the high mechanical strength and thermal/chemical stability of the PAES phase may suppress the formation of the lithium dendrites and may secure the long-term safety of the lithium secondary batteries. The PEG phase may have the high liquid electrolyte-containing ability and may allow a flexible movement of a segment having an ether group, thereby to provide a smooth transport ability of the lithium ions and lower resistance of the protective layer. In this way, the performance of the lithium secondary battery may be improved.

In addition to the effects as described above, specific effects of the present disclosure will be described together with the detailed description for carrying out the disclosure.

DETAILED DESCRIPTIONS

Figure 1:
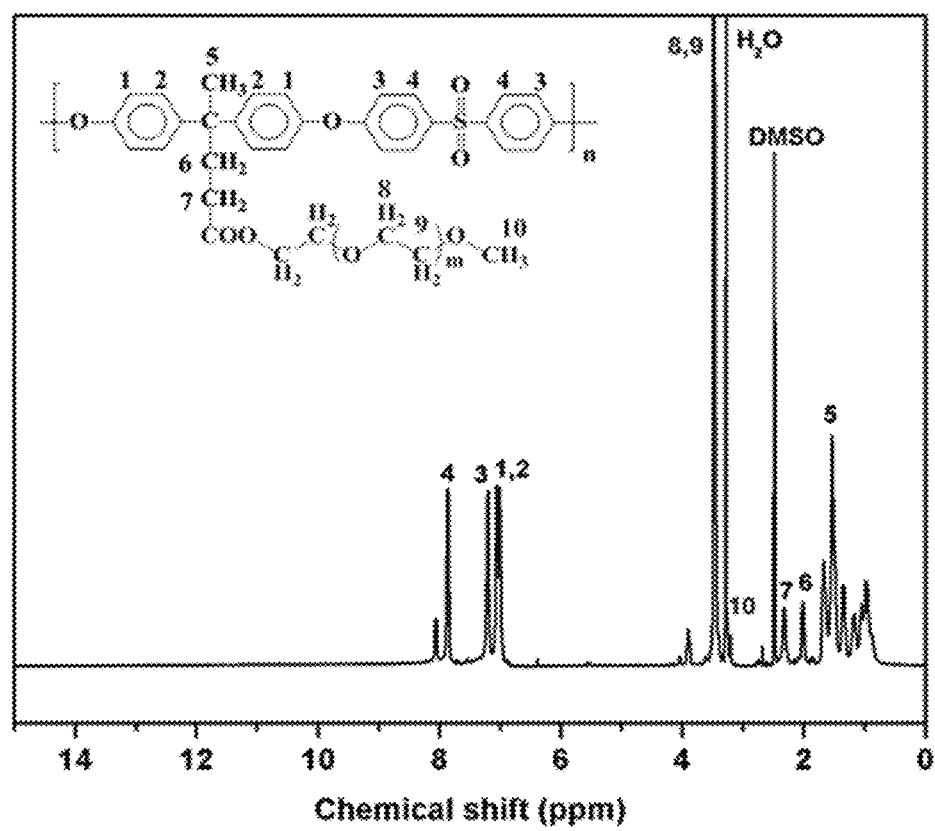
FIG. 1 shows $^1$H-NMR and FT-IR spectra of PAES-g-PEG synthesized according to a Present Example.
Figure 1:
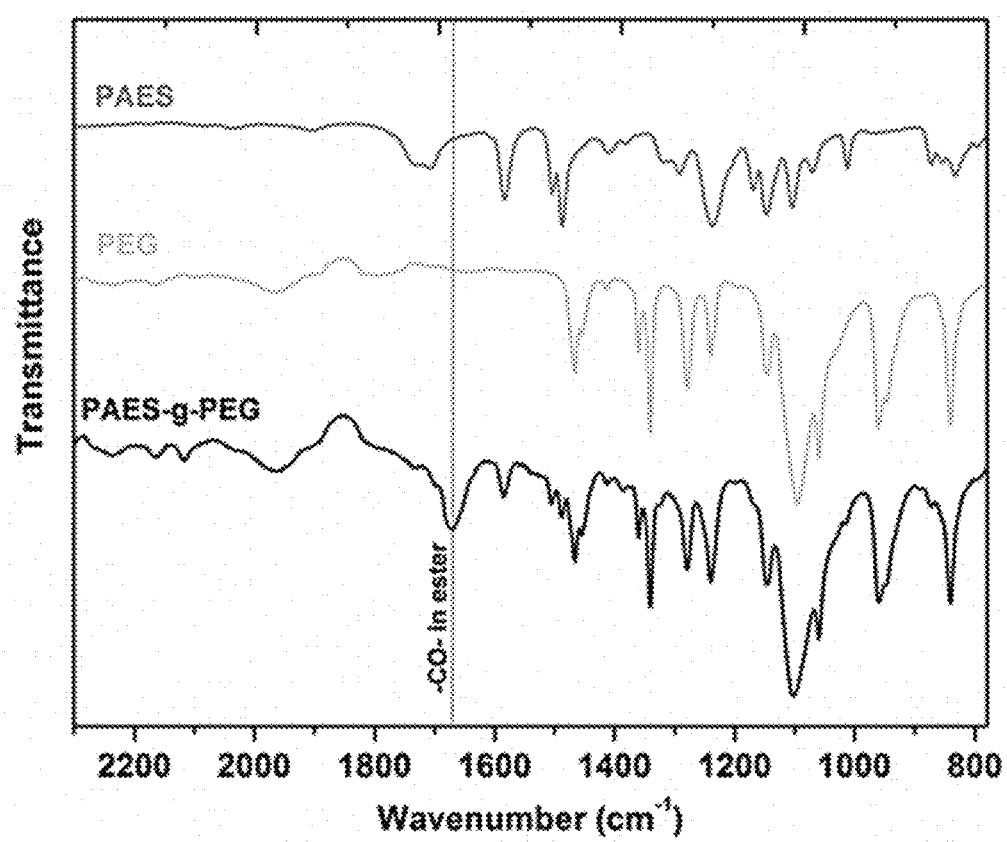

For simplicity and clarity of illustration, elements in the figures are not necessarily drawn to scale. The same reference numbers in different figures denote the same or similar elements, and as such perform similar functionality. Further, descriptions and details of well-known steps and elements are omitted for simplicity of the description. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Examples of various embodiments are illustrated and described further below. It will be understood that the description herein is not intended to limit the claims to the specific embodiments described. On the contrary, it is intended to cover alternatives, modifications, and equivalents as may be included within the spirit and scope of the present disclosure as defined by the appended claims.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises", "comprising", "includes", and "including" when used in this specification, specify the presence of the stated features, integers, operations, elements, and/or components, but do not preclude the presence or addition of one or more other features, integers, operations, elements, components, and/or portions thereof. As used herein, the term "and/or" includes any and all combinations of one or more of the associated listed items. Expression such as "at least one of" when preceding a list of elements may modify the entire list of elements and may not modify the individual elements of the list.

It will be understood that, although the terms "first", "second", "third", and so on may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

A method for synthesizing a poly(arylene ether sulfone)-poly(ethylene glycol) graft copolymer according to an embodiment of the present disclosure may include performing esterification reaction between a compound represented by a following Chemical Formula 1-1 and a compound represented a following Chemical Formula 1-2 to synthesize the poly(arylene ether sulfone)-poly(ethylene glycol) graft copolymer represented by a following Chemical Formula 1:

[Chemical Formula 1-1]

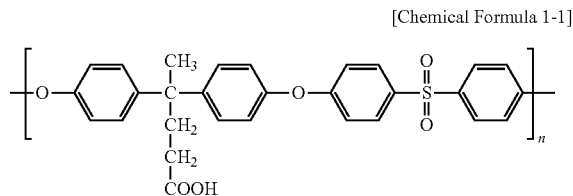

where, in the Chemical Formula 1-1, n is an integer of 60 to 80,

[Chemical Formula 1-2]

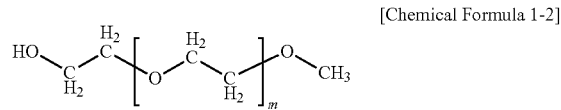

where, the Chemical Formula 1-2, m is an integer of 40 to 45,

[Chemical Formula 1]

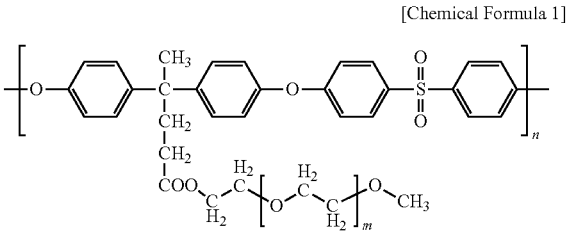

where, in the Chemical Formula 1, n is an integer of 60 to 80, and m is an integer of 40 to 45.

The compound represented by the Chemical Formula 1-1 has a structure in which poly(arylene ether sulfone) (PAES) acts as a main chain, and a carboxyl group is introduced to a side chain thereof. The compound having such a structure (hereinafter, referred to as PAES-COOH) may be produced by dissolving HPV and FPS into a solvent in which DMSO and toluene are mixed with each other, and then performing synthesizing reaction thereof for 3 days at a temperature of 160 to 180° C.

The compound represented by the Chemical Formula 1-2 (hereinafter, referred to as PEG-OH) has a structure in which a hydroxyl group is introduced to an end of a poly(ethylene glycol) (PEG) containing an ether group.

Therefore, according to the present disclosure, the esterification reaction between PAEG-COOH and PEG-OH may occur due to presence of a carboxy group and a hydroxy group, thereby to synthesize the graft copolymer.

In this connection, in order to increase the esterification reactivity, the reaction may be carried out under presence of 4-dimethylaminopyridine (DMAP) and N,N'-dicyclohexyl-carbodiimide (DCC).

Further, the reaction may be performed in a DMF solvent at a temperature of 60 to 100° C., but may not be limited thereto.

In one example, the copolymer synthesized via the reaction has a structure in which poly(ethylene glycol) (PEG) is grafted to poly(arylene ether sulfone) (PAES), and may be represented by the Chemical Formula 1.

The copolymer represented by the Chemical Formula 1 (hereinafter, referred to as PAES-g-PEG) includes a repeat unit of PAES having excellent mechanical properties and thermal/chemical stability, and PEG having a flexible ether group allowing smoothly transporting of lithium ions. Thus, the copolymer represented by the Chemical Formula 1 may have high chemical/mechanical stability while reducing the lithium ion conductivity, and may be used as a material of a protective layer to effectively protect a lithium metal negative electrode.

That is, a protective layer for protecting a lithium metal negative electrode for a lithium secondary battery to achieve another purpose of the present disclosure may contain a poly(arylene ether sulfone)-poly(ethylene glycol) graft copolymer (PAES-g-PEG) represented by the Chemical Formula 1.

Specifically, the negative-electrode protective layer may be formed on the lithium metal surface. Due to the phase separation between PAES and PEG grafted thereto, the PAES phase may suppress the formation of lithium dendrites using high mechanical strength and thermal/chemical stability thereof, while the PEG phase has high liquid electrolyte-containing ability, and allows flexible movement of segments having the ether group to provide smooth transport of lithium ions, thereby reducing the resistance of the negative-electrode protective layer.

That is, as the negative-electrode protective layer contains the PAES-g-PEG, and thus has a high ionic conductivity of $0.27 \times 10^{-3}$ S/cm or greater, and a liquid electrolyte uptake of 55% or greater.

Further, the tensile strength of the negative-electrode protective layer is 2.0 MPa or greater, and the break elongation thereof is 60% or greater. A thermal decomposition temperature (Td) of the negative-electrode protective layer is 200° C. or higher, and thus has excellent mechanical strength and thermal/chemical stability.

In one example, the liquid electrolyte absorbed into the negative-electrode protective layer may contain a lithium salt and at least one organic solvent selected from ethylene carbonate (EC), acetonitrile (ACN) and diethyl carbonate (DEC).

In one embodiment, the liquid electrolyte may contain ethylene carbonate (EC), acetonitrile (ACN) and diethyl carbonate (DEC). In this connection, the ethylene carbonate (EC), acetonitrile (ACN) and diethyl carbonate (DEC) may be preferably contained in a volume ratio of 3:3.5 to 4.5:2.5 to 3.5. When the mixing volume ratio is in the above range, ethylene carbonate (EC) and diethyl carbonate (DEC) having high electrochemical stability, and acetonitrile (ACN) having low viscosity are properly blended with each other, so that the mixed liquid electrolyte has high conductivity and thermal stability.

Further, the lithium salt may include LITFSI (lithium bis(trifluoromethanesulfyl)) having high thermal stability, and having non-sensitivity to moisture, but may not be limited thereto.

When the liquid electrolyte as described above is used, the mechanical strength and thermal/chemical stability of the negative-electrode protective layer are increased. Accordingly, the effect of suppressing the formation of lithium dendrites may be enhanced, and resistance of an interface between the electrode and the protective layer may be reduced, thereby improving the performance of the lithium secondary battery.

Therefore, it is most preferred that the negative-electrode protective layer according to the present disclosure is used in combination with the liquid electrolyte containing the ethylene carbonate (EC), acetonitrile (ACN) and diethyl carbonate (DEC) in a volume ratio of 3:4:3.

Further, in another embodiment of the present disclosure, a method for producing a protective layer for protecting a lithium metal negative electrode for a lithium secondary battery is provided. The method may include dissolving a poly(arylene ether sulfone)-poly(ethylene glycol) graft copolymer represented by the above Chemical Formula 1 into a solvent to prepare a first solution; and applying the first solution to a lithium metal surface under argon gas.

First, a step of producing the first solution may be performed by dissolving a poly(arylene ether sulfone)-poly(ethylene glycol) graft copolymer represented by the Chemical Formula 1 into the solvent.

In this connection, the solvent is not particularly limited, but may include tetrahydrofuran (THF). The mixture of the graft copolymer and the solvent may be stirred for about 1 to 3 hours to produce the first solution.

Next, a step of applying the first solution to the lithium metal surface under argon gas is performed.

Specifically, the first solution may be applied to the lithium metal surface using a doctor blade in an argon gas atmosphere glove box to form a film of a predetermined thickness thereon. Thereafter, the lithium metal having the first solution coated thereon may be stored at room temperature for at least one day, followed by vacuum drying at a temperature of about 40 to 45° C., thereby to form the protective layer on the lithium metal surface.

Furthermore, in another embodiment of the present disclosure, a lithium secondary battery comprising a positive-electrode; a negative-electrode; and liquid electrolyte may be provided, wherein the negative-electrode includes lithium metal, wherein the lithium secondary battery further comprises the protective layer as defined above formed on a surface of the lithium metal of the negative-electrode.

In this connection, the liquid electrolyte contains: lithium bis(trifluoromethanesulfonyl) (LITFSI) as a lithium salt; and ethylene carbonate (EC), acetonitrile (ACN) and diethyl carbonate (DEC) as an organic solvent, wherein the liquid electrolyte contains ethylene carbonate (EC), acetonitrile (ACN) and diethyl carbonate (DEC) in a volume ratio of 3:3.5 to 4.5:2.5 to 3.5.

The lithium secondary battery according to an embodiment of the present disclosure contains the protective layer as defined above formed on a surface of the lithium metal of the negative-electrode. Due to the high mechanical strength, high thermal/chemical stability, and high lithium ion conductivity of the protective layer, the formation of lithium dendrites may be suppressed to ensure long-term safety of the battery, and the resistance of the interface between the electrode and the protective layer is lowered to improve the battery performance.

Hereinafter, various Present Examples and Experimental Examples according to the present disclosure will be described. However, the Present Examples below are only some examples according to the present disclosure, and the present disclosure should not be interpreted as being limited to the following Present Examples.

Synthesis of PAES-g-PEG ((poly(arylene ether sulfone)-g-poly(ethylene glycol))

1) Synthesis of PAES-COOH

HPV (5.72 g, 0.02 mol) and FPS (5.08 g, 0.02 mol) were dissolved in a mixed solvent of DMSO (80 g) and toluene (70 g) in a 500 ml three-necked flask having a dehydration device. A polymerization reaction was carried out for 3 days at a temperature of 172° C. Thereafter, the resulting solid was dissolved in a mixed solution of tetrahydrofuran (THF) and hydrogen chloride (HCl), and was precipitated in isopropyl alcohol (IPA). Then, impurities were removed from the precipitates which in turn were dried to obtain PAES-COOH.

2) Synthesis of PAES-g-PEG (Present Example 1)

PAES-COOH (5.52 g), and PEG-OH (28 g) were added to a DMF solvent. Then, esterification reaction thereof was carried out using 4-dimethylaminopyridine (DMAP, 0.0412 g) and N,N'-dicyclohexylcarbodiimide (DCC, 4.64 g)) for 2 days at 80° C. temperature. Thereafter, the resulting solid was precipitated in an ether solution, and then impurities were removed therefrom using distilled water and then the precipitates were dried to obtain PAES-g-PEG (>60% yield).

FIG. 1 shows $^1$H-NMR and FT-IR spectra of PAES-g-PEG synthesized according to the Present Example.

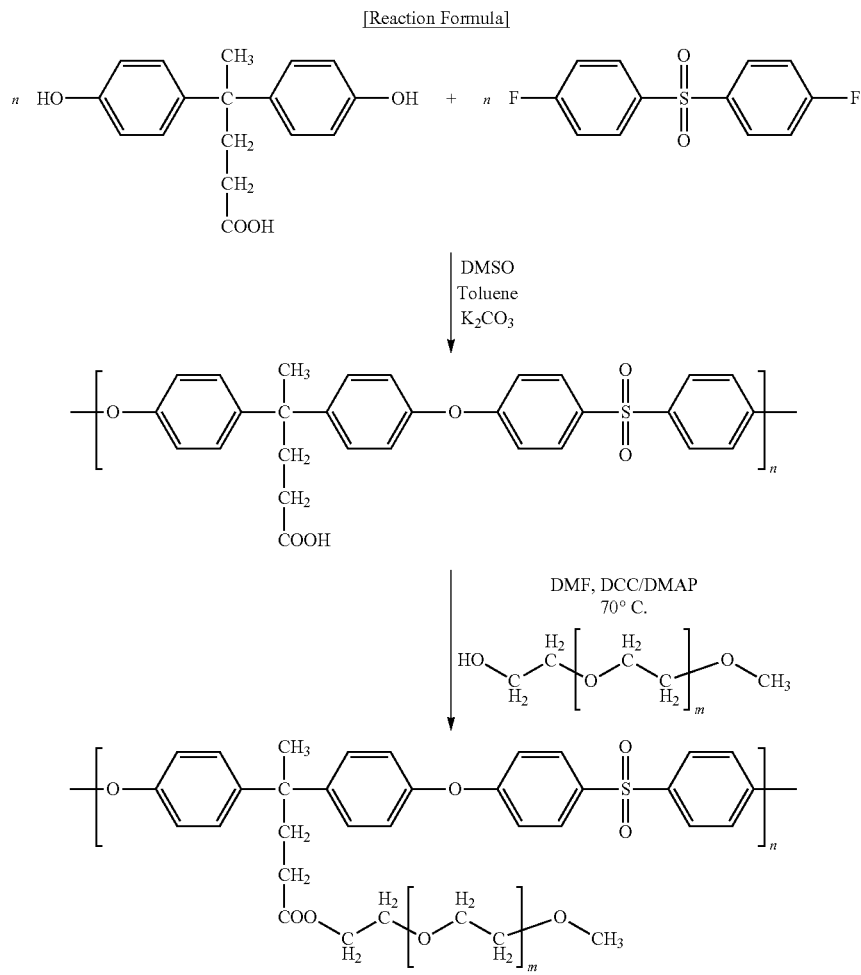

Referring to FIG. 1, it may be seen that the PAES-g-PEG copolymer in which the PAES-COOH is a main chain and the PEG is grafted thereto was synthesized.

Synthesis of EC/ACN/DEC Liquid Electrolyte

Ethylene carbonate (EC), diethyl carbonate (DEC) and acetonitrile (ACN) were mixed with each other in a volume ratio of 3/4/3, and, then, the mixture was stirred at room temperature for 4 hours to form a solution. Thereafter, 1 M of lithium bis(fluoromethane sulfonyl) (LiTFSI) salt was added thereto and then the mixture was stirred for 24 hours to synthesize liquid electrolyte (Present Example 2a).

Further, a solution containing only acetonitrile (ACN) and a solution containing only diethyl carbonate (DEC) were prepared, and a mixed solution of ACN:DEC (1:1 (v/v)) was prepared. Then, 1M of lithium bis(fluoromethane sulfonyl) (LiTFSI) salt was added thereto, and then the mixture was stirred for 24 hours, thereby to synthesize liquid electrolytes (Present Examples 2b, 2c, and 2d), respectively.

Production of Protective Layer to Protect Lithium Metal Negative Electrode for Lithium Secondary Battery To form a PAES-g-PEG protective layer on the surface of lithium metal, PAES-g-PEG (1.5 g) produced according to Present Example 1 was dissolved in tetrahydrofuran (THF, 10 ml) and the mixture was stirred for 2 hours. Thereafter, the mixture was applied on the lithium metal to a certain thickness under argon gas, thereby to coat the PAES-g-PEG on both faces of the lithium metal. Thereafter, after storing the lithium metal having the coated PAES-g-PEG thereon in a glove box at room temperature for 24 hours, the lithium metal having the coated PAES-g-PEG thereon was subjected to vacuum drying at a temperature of 40° C., thereby to completely remove the residual solvent. Thus, the protective layer was formed to protect the lithium metal negative electrode for the lithium secondary battery.

Evaluation of Properties of Organic Liquid Electrolyte

The electrochemical and thermal properties of the liquid electrolytes containing 1M of lithium bis(fluoromethane sulfonyl) (LiTFSI) salt were checked, and the results are shown in FIG. 2A-2D.

Figure 2A:
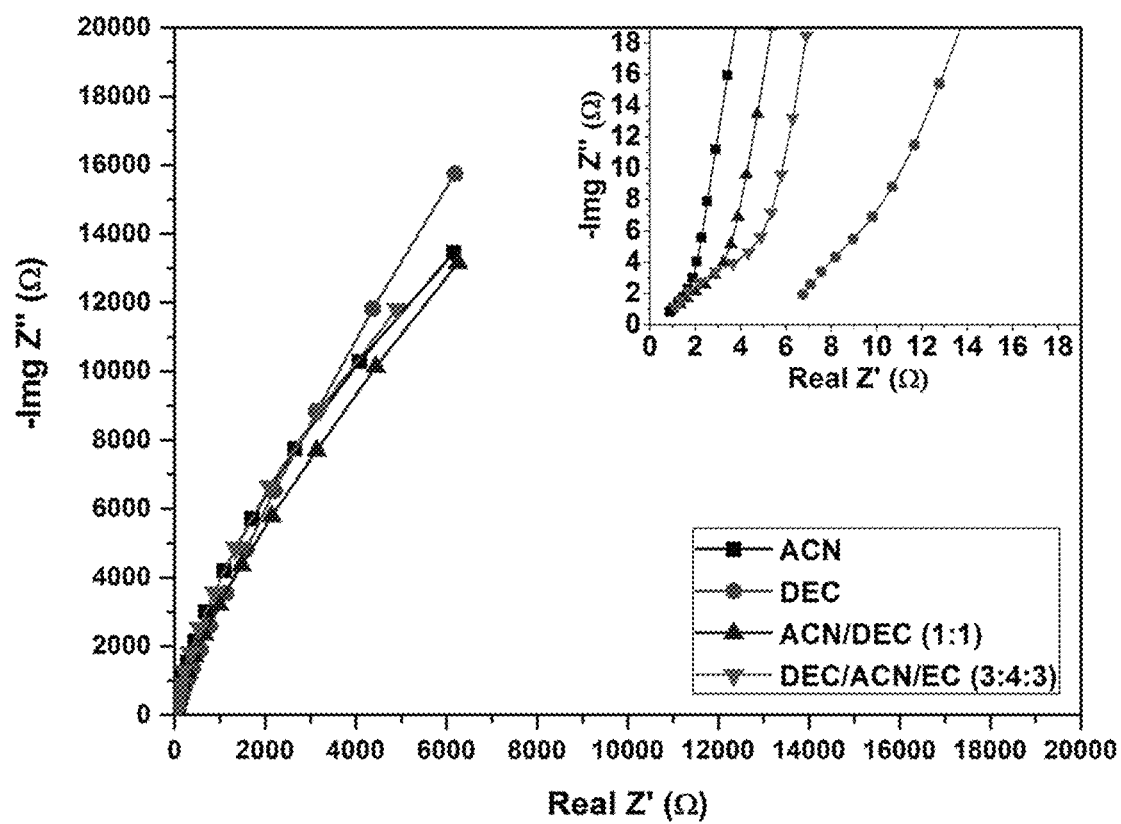
FIG. 2A to 2D show electrochemical and thermal properties of liquid electrolytes containing 1M of lithium bis (fluoromethane sulfonyl) (LiTFSI) salt.
Figure 2B:
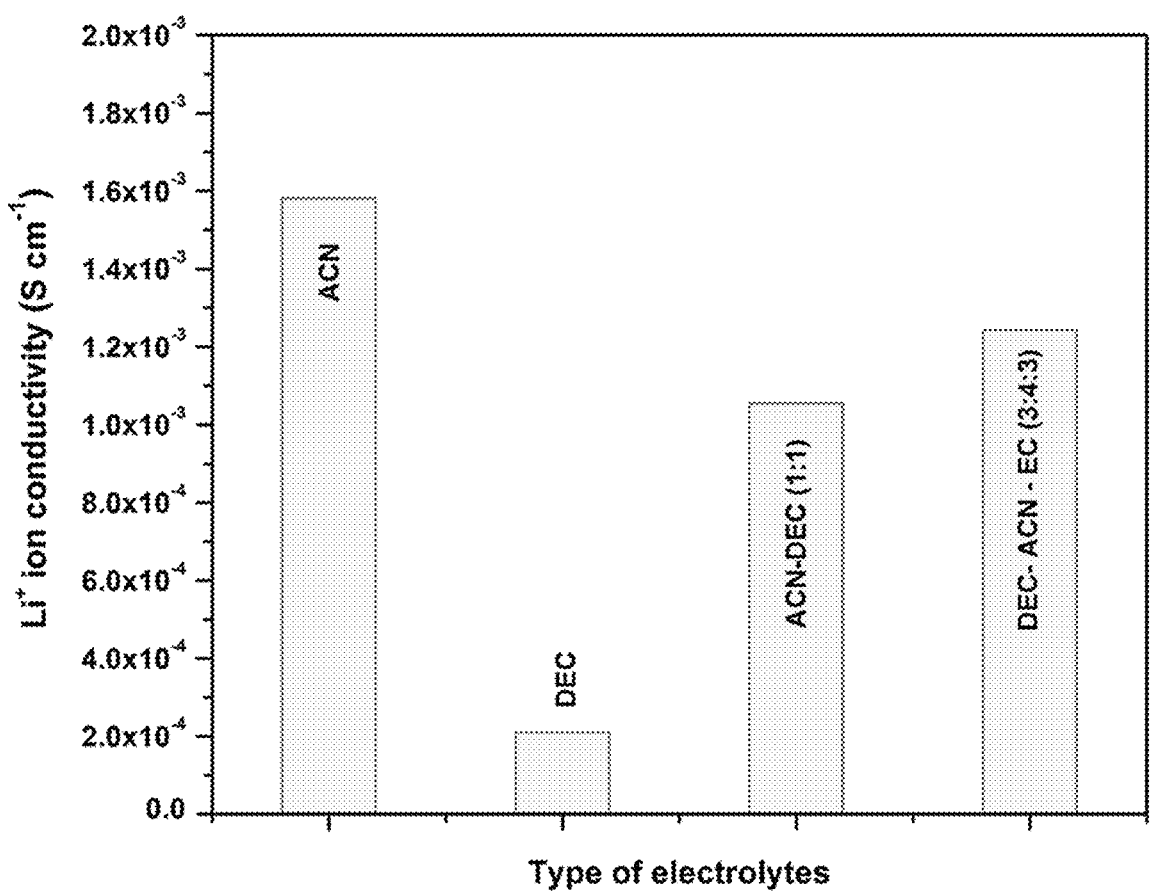

FIG. 2A shows a Nyquist plot of a impedance measured at SS/PP/SS cells of the liquid electrolytes according to the present examples, and FIG. 2B shows conductivity values of the lithium cations calculated based on the Nyquist plot.

As shown in FIG. 2B, the conductivity of the lithium cation of the liquid electrolyte tended to increase as a content of ACN having a low viscosity increased.

Specifically, in the Present Example 2b containing only ACN, the conductivity of the lithium cation exhibited the highest value as $1.59 \times 10^{-3}$ S/cm. Next, in the EC/ACN/DEC (3/4/3, v/v/v) mixture of Present Example 2a, the conductivity of the lithium cation was as high as $1.4 \times 10^{-3}$ S/cm.

Figure 2C:
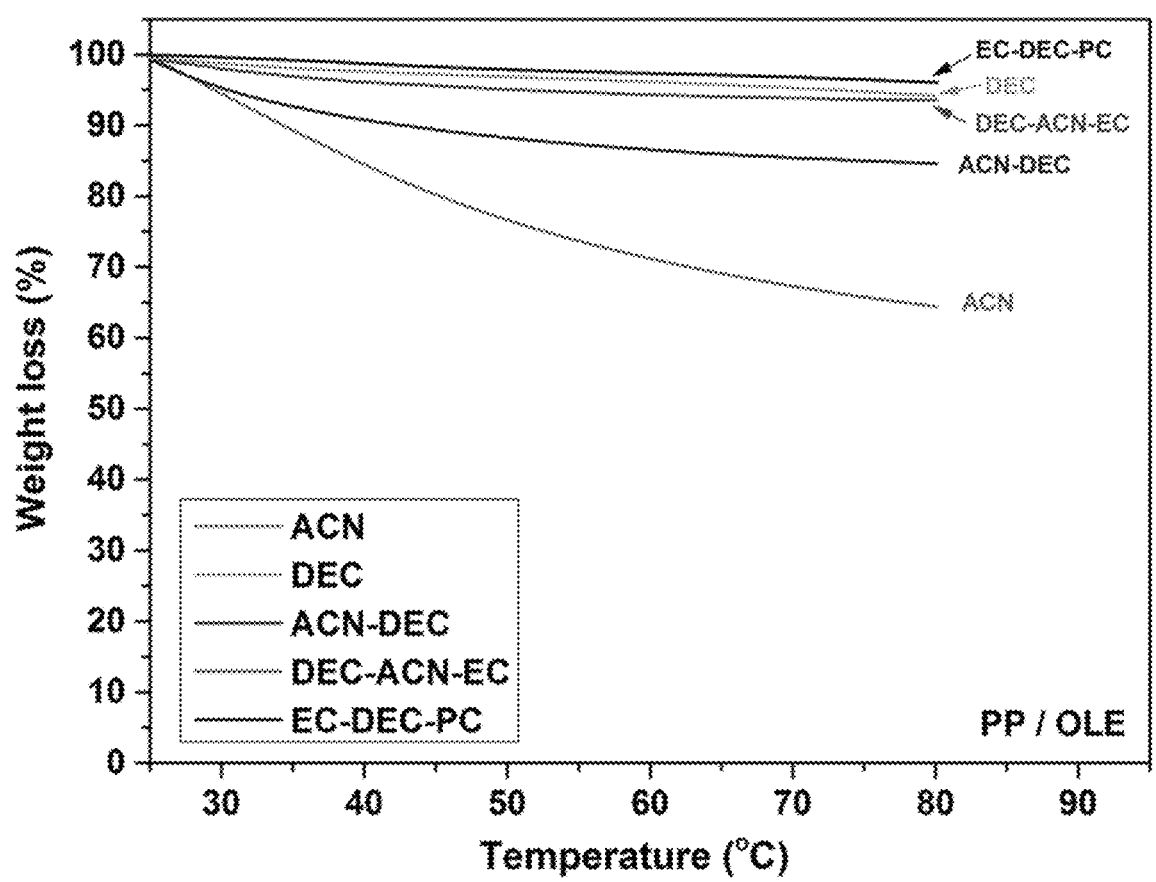

FIG. 2C shows the result of measuring the thermal stability of the liquid electrolyte in a temperature from 25° C. to 80° C. at a rate of 0.5° C./min using TGA.

Referring to FIG. 2C, it may be seen that the evaporation of the electrolyte containing ACN is the highest. It may be seen that the EC/ACN/DEC (3/4/3, v/v/v) mixture of Present Example 2a hardly evaporates and thus has high thermal stability.

Figure 2D:
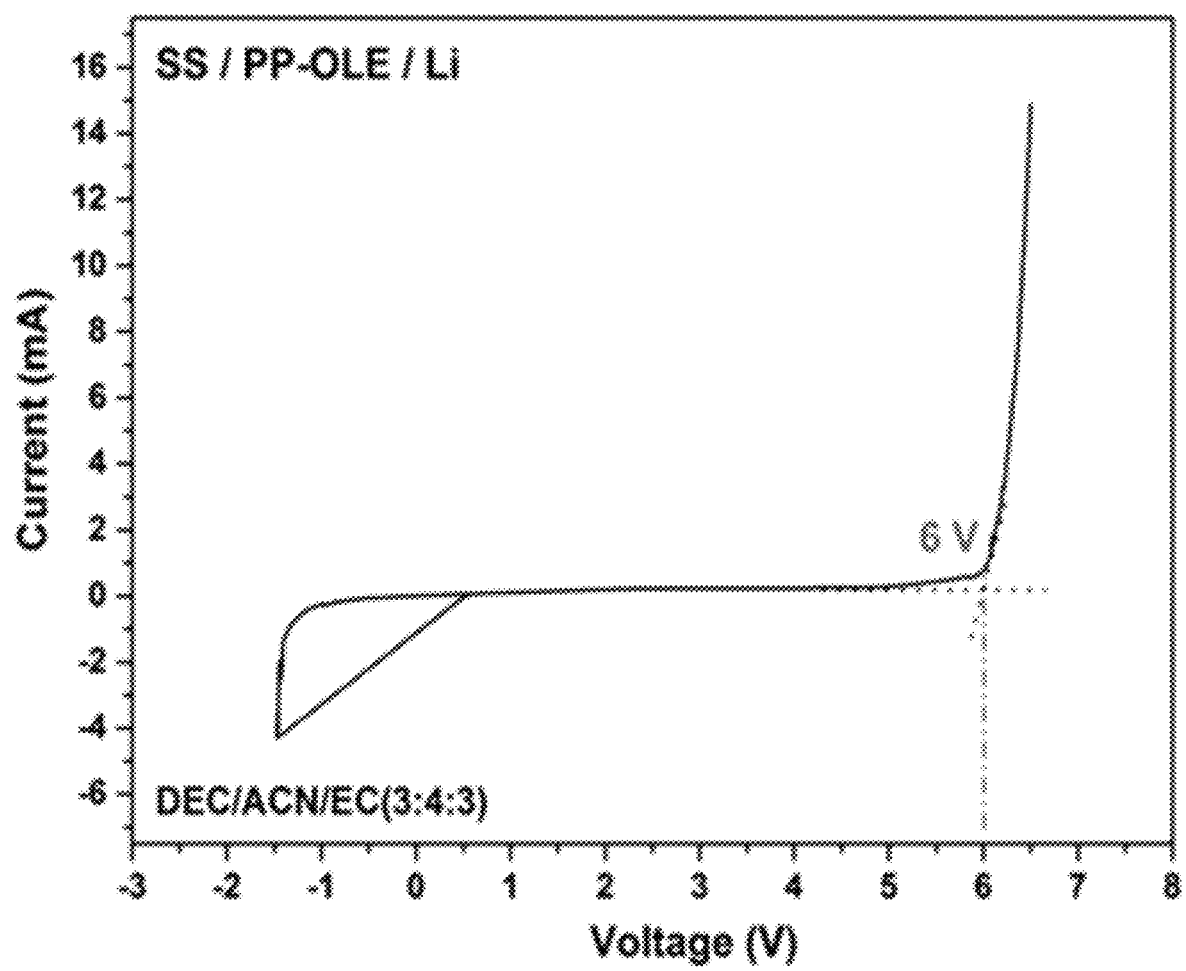

Further, FIG. 2D shows the result of performing LSV at SS/PP/Li cells.

Referring to FIG. 2D, it may be identified that the mixture of EC/ACN/DEC (3/4/3, v/v/v) is stable over a large voltage range of 0 to 5.5 V, and thus has high electrochemical stability.

That is, it may be seen that the 1M LiTFSI EC/ACN/DEC (3/4/3, v/v/v) liquid electrolyte according to Present Example 2a according to the present disclosure has higher lithium ion conductivity, thermal stability, and electrochemical stability than those in Present Examples 2b to 2d and thus is the most preferable liquid electrolyte.

Compatibility Evaluation of PAES-G-PEG Protective Layer and Liquid Electrolyte

To check compatibility between the PAES-g-PEG protective layer according to Present Example 1 and the EC/ACN/DEC liquid electrolyte according to Present Example 2a, liquid electrolyte uptake, dimensional swelling, lithium ion conductivity were measured, and UTM and TGA analysis were conducted. FIG. 3A-3D show the results thereof.

Figure 3A:
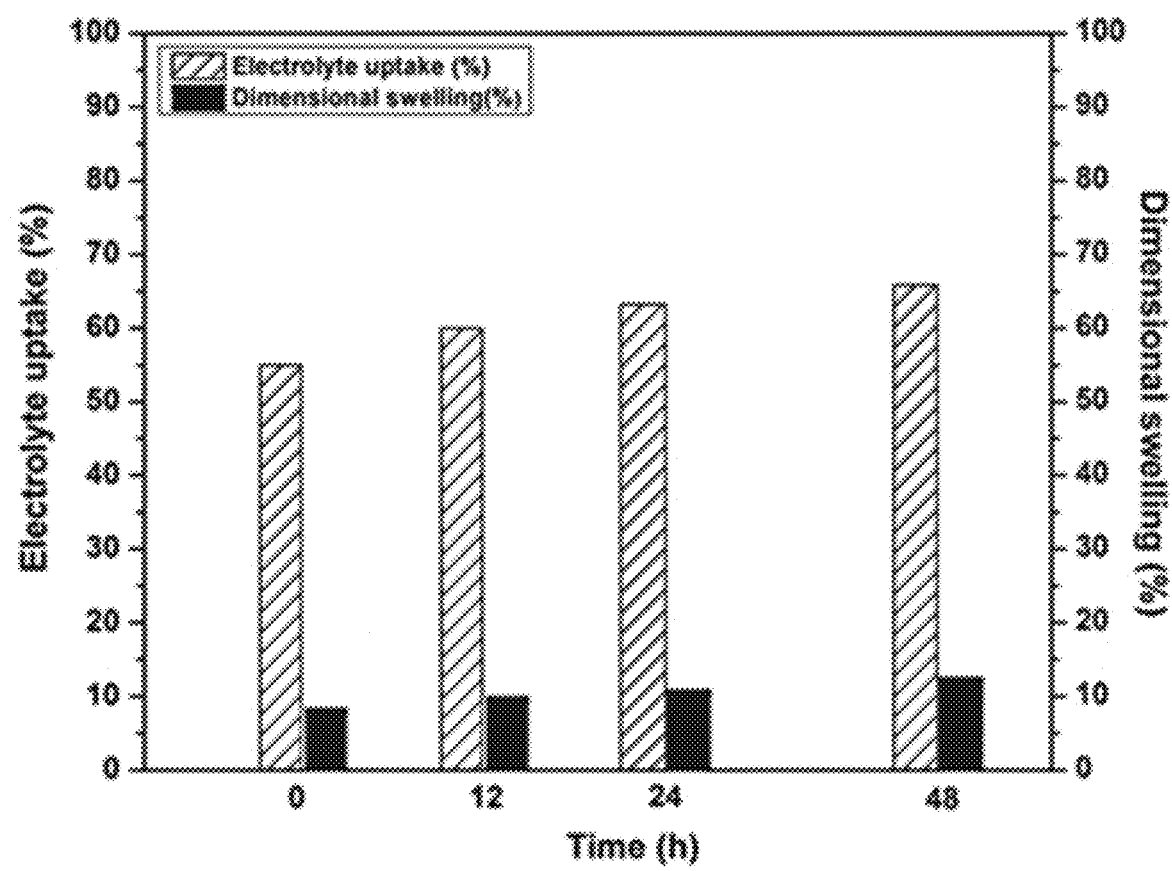
FIG. 3A to 3D show results of measuring a liquid electrolyte uptake, dimensional swelling, and lithium ion conductivity of a protective layer according to a Present Example.

Referring to FIG. 3A, it may be seen that the liquid electrolyte uptake of Present Example 1 is 55%, while the dimensional swelling thereof is not high, and is about 12%. This means that the protective layer according to the present disclosure based on the PAES-g-PEG covers the lithium metal surface at high stability.

Figure 3B:
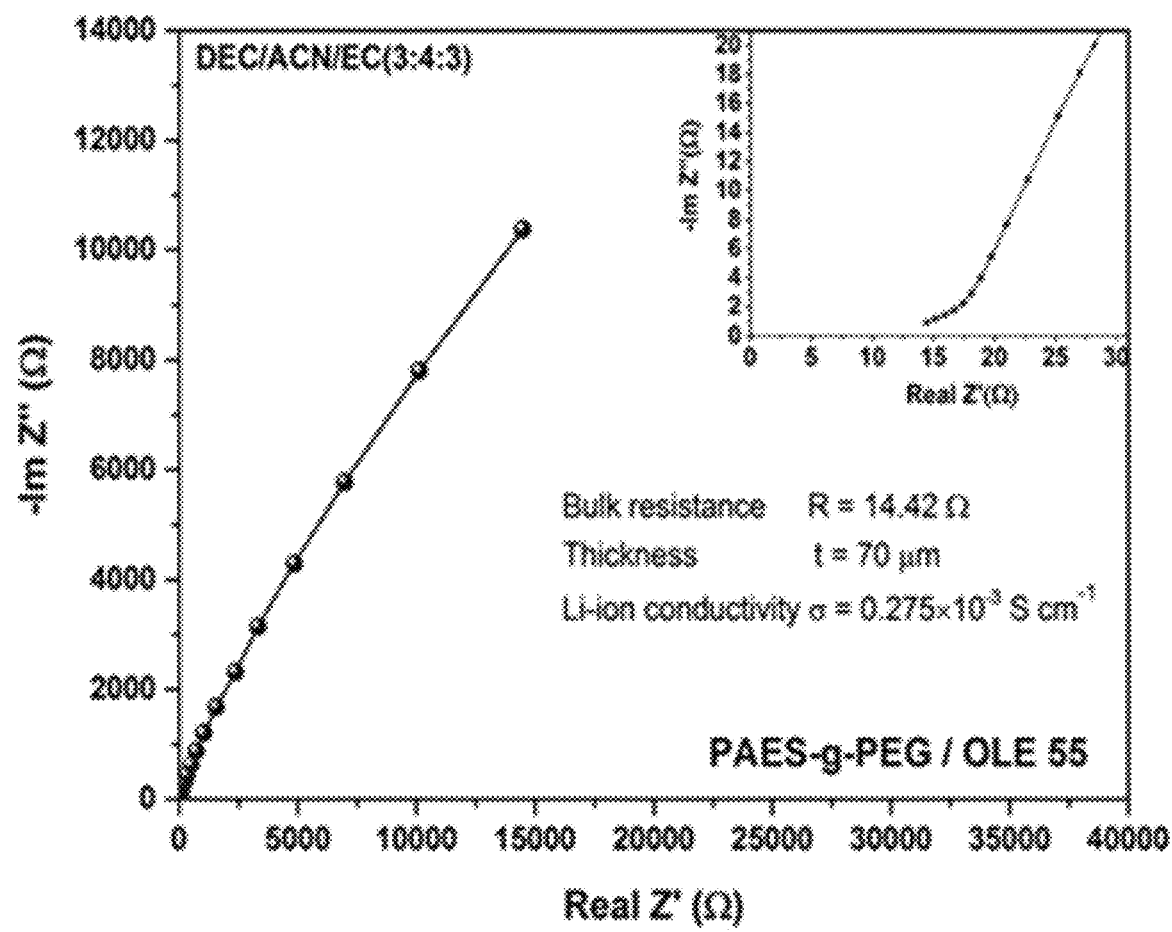

FIG. 3B shows the Nyquist plot drawn based on the impedance measured at (SS/SE/SS) cells of the protective layer having a 55% liquid electrolyte uptake.

As shown in FIG. 3B, the ion conductivity of the protective layer according to the present disclosure was measured to be $0.275 \times 10^{-3}$ S/cm at room temperature. This means that the protective layer of Present Example 1 is a lithium ion conductive layer in which lithium ions are coordinated with an ether group in the PEG phase.

Figure 3C:
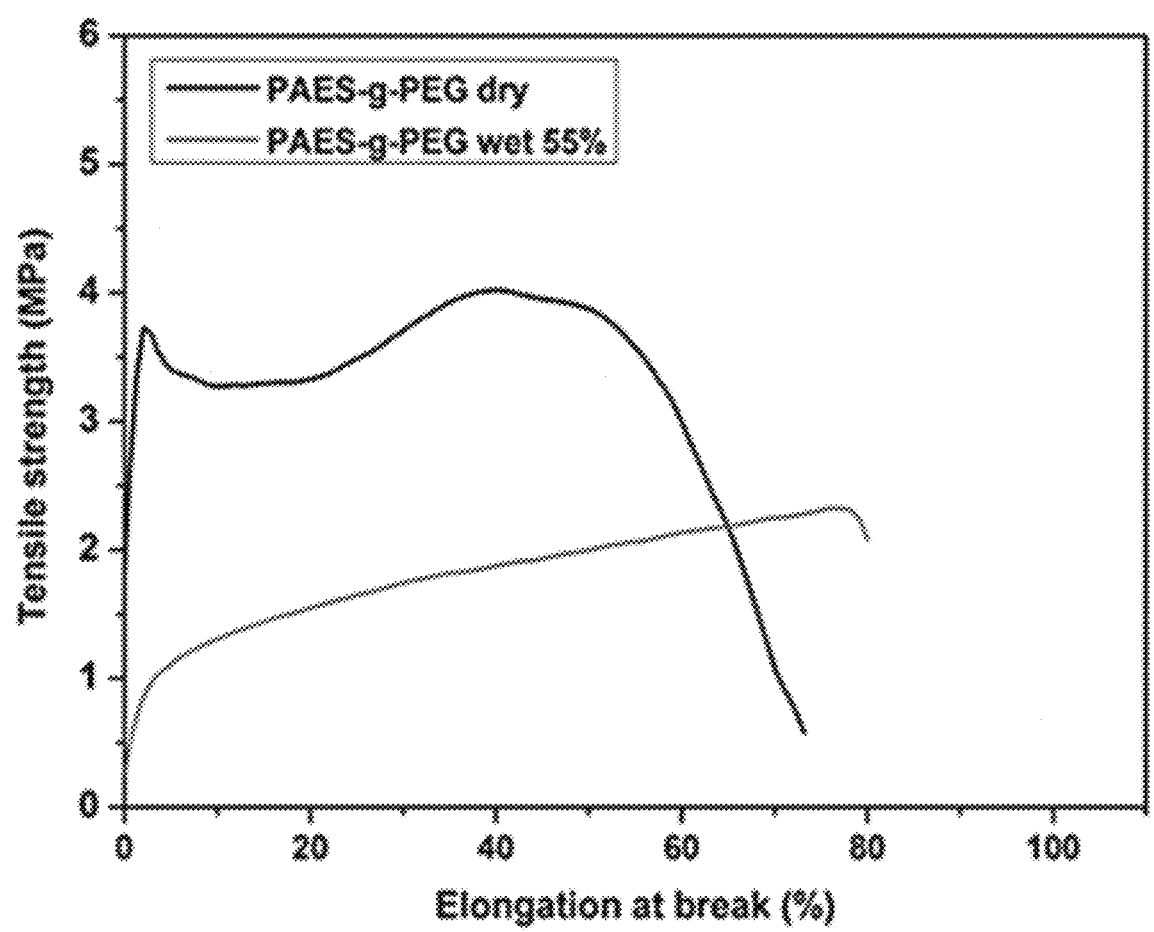

FIG. 3C shows the result of measuring, via UTM, a stress-strain curve before and after absorption of the liquid electrolyte into the protective layer.

The protective layer before liquid electrolyte absorption thereto showed high tensile strength of 4.0 MPa and break elongation of 60%, while the protective layer after the liquid electrolyte uptake by 55% showed tensile strength of 2.0 MPa and break elongation of 80%. When considering that the break elongation increases in the protective layer after the liquid electrolyte uptake, it may be seen that the protective layer after the liquid electrolyte absorption has higher mechanical strength. Accordingly, it is identified that the protective layer may act as a factor limiting growth of lithium dendrites.

Figure 3D:
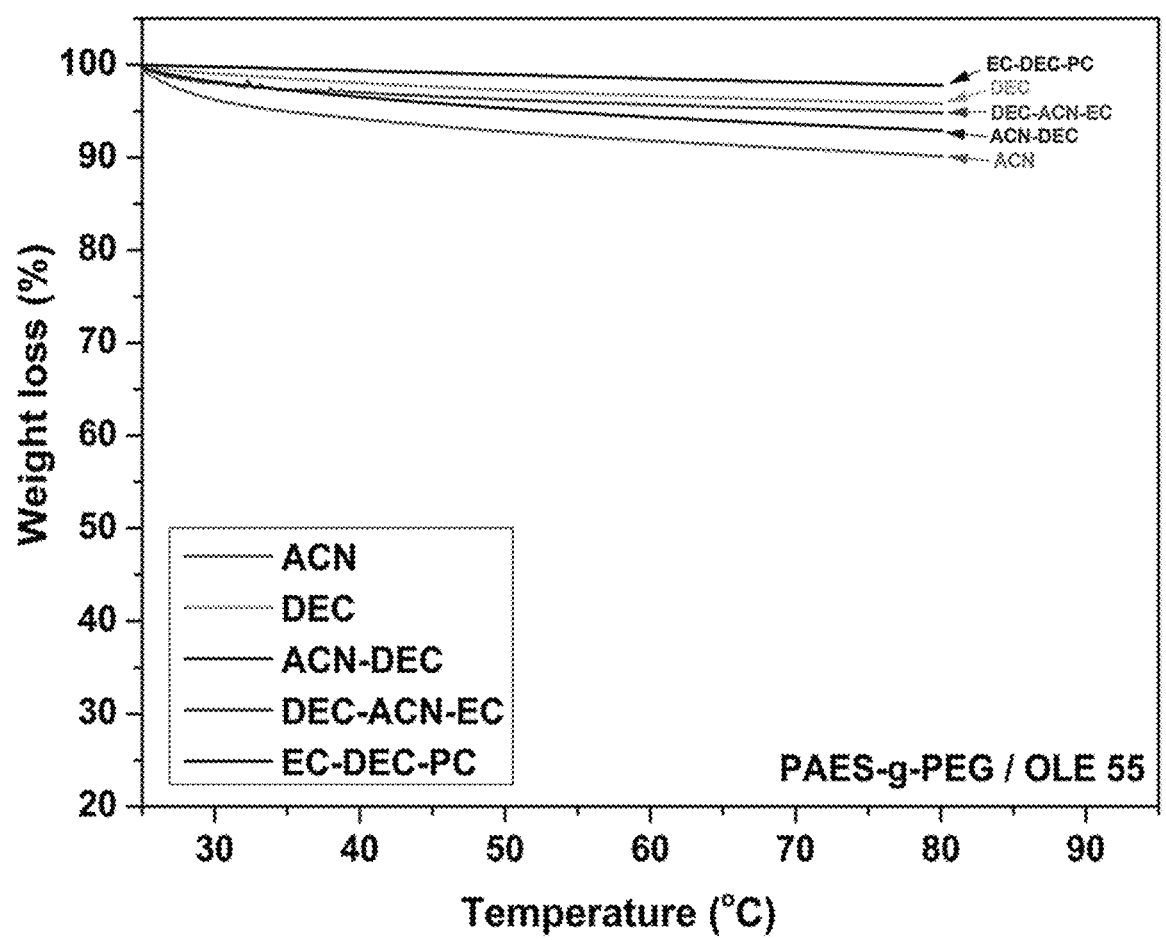

Referring to FIG. 3D, which measured the thermal stability of the protective layer, the protective layer which has absorbed the liquid electrolyte (Present Example 2a) containing the mixture had the smallest weight loss of about 5%. This means that the protective layer is compatible with the mixture-based liquid electrolyte and thus satisfies thermal stability requirements for use in lithium secondary batteries.

Identification of Stability of Lithium Metal on which PAES-g-PEG Protective Layer is Coated In order to identify antioxidant ability of the protective layer according to Present Example 1, surface morphology and composition analysis of the lithium metal before and after the protective layer was coated thereon was performed (see FIG. 4A-4I). Surface morphology was analyzed using AFM and FE-SEM, and composition analysis was conducted using XPS analysis.

Figure 4A:
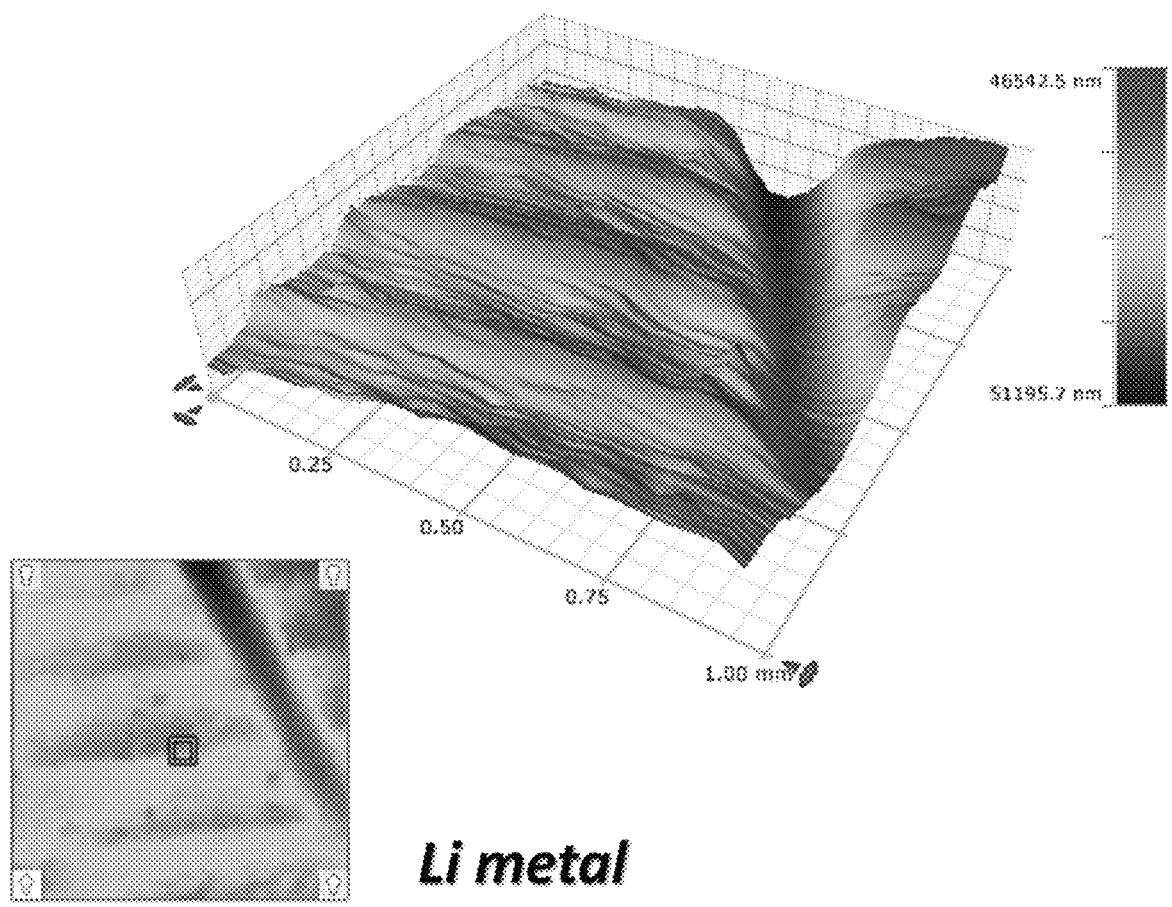
FIG. 4A to 4I show results of analysis of a surface morphology and a composition of lithium metal before and after a protective layer coating according to a Present Example.
Figure 4B:
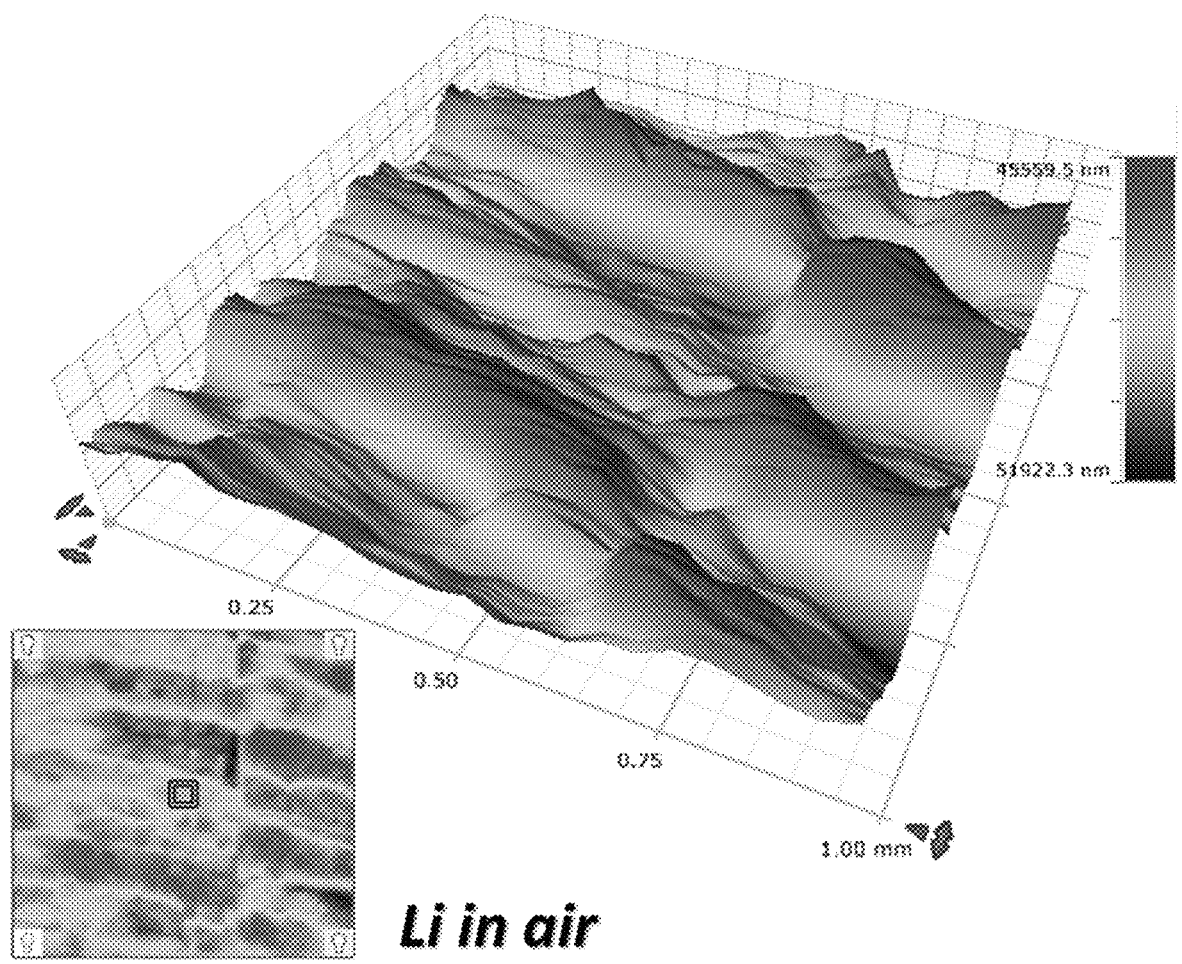
Figure 4C:
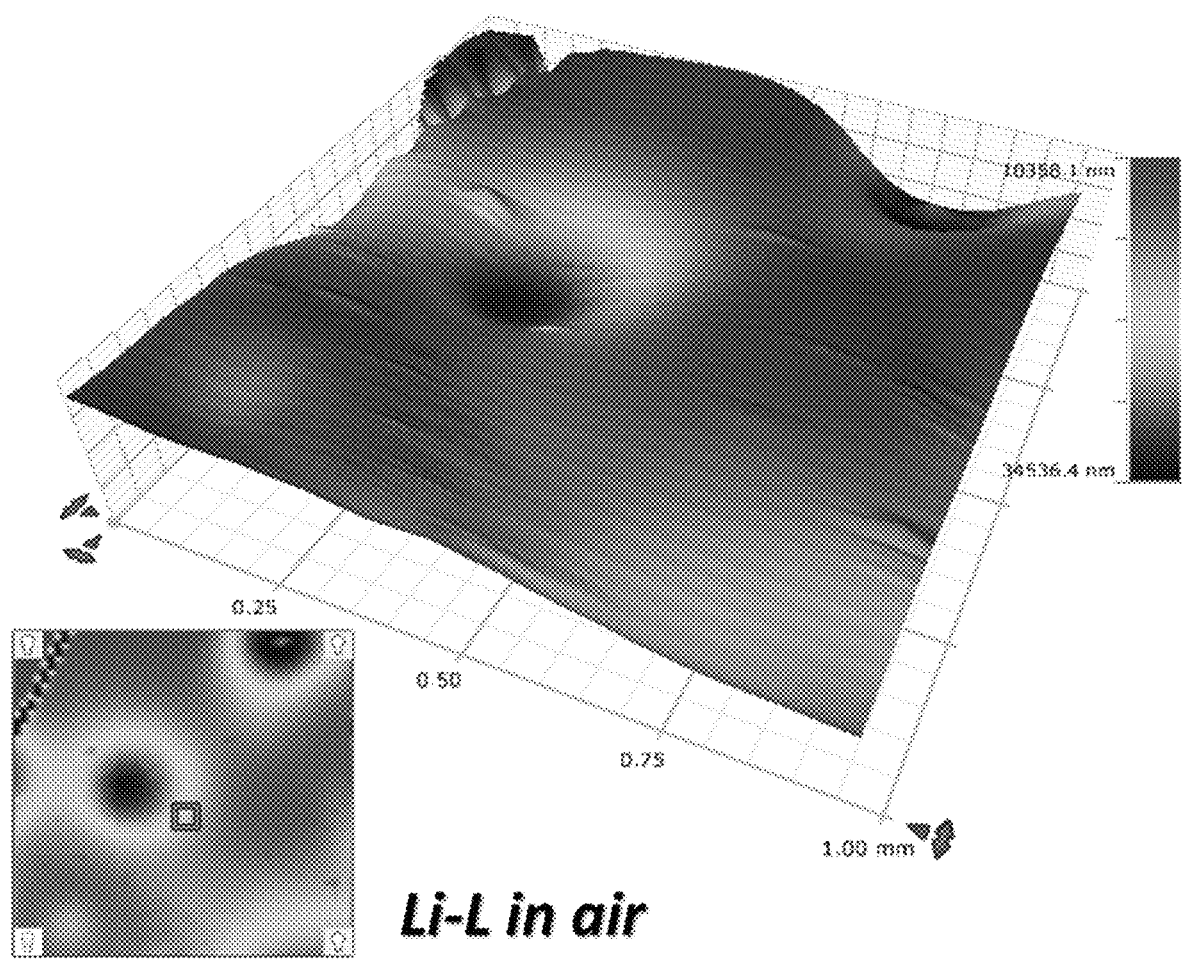

Referring to FIGS. 4A and 4B, a surface of the lithium metal and a surface of the lithium metal in the air were rough. However, as shown in FIG. 4C, a surface of the lithium metal having the PAES-g-PEG protective layer coated thereon was smooth.

The rough surface of the lithium metal without the protective layer coated thereon is due to formation of a passive layer ($Li_2CO_3$ salt) resulting from the reaction between lithium, oxygen, and carbonate ($CO_3^{2-}$).

Figure 4D:
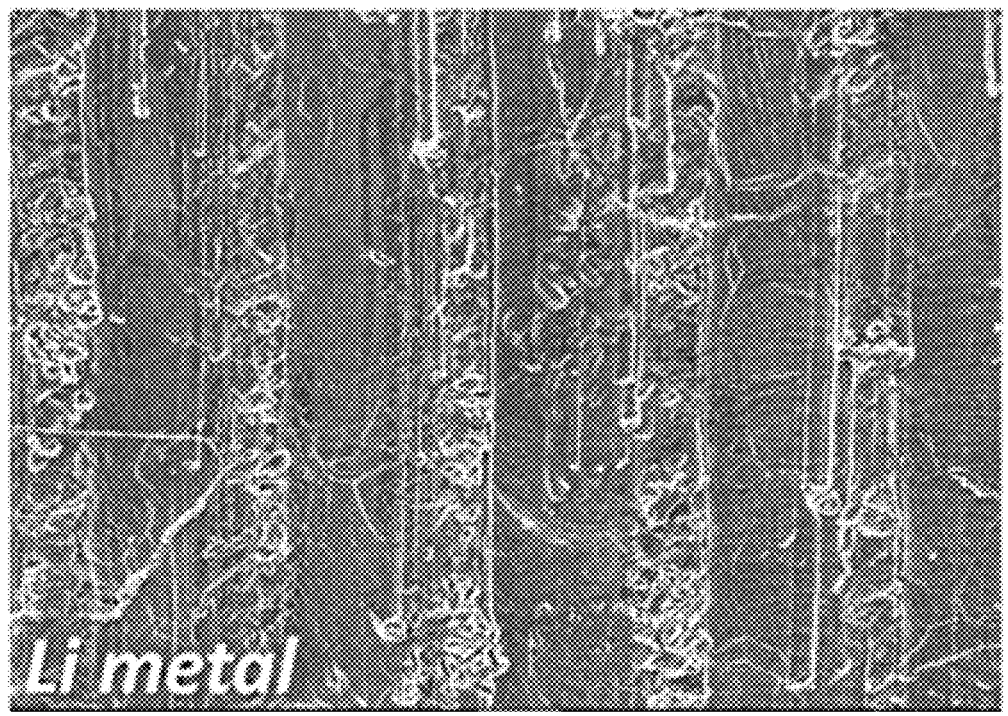
Figure 4E:
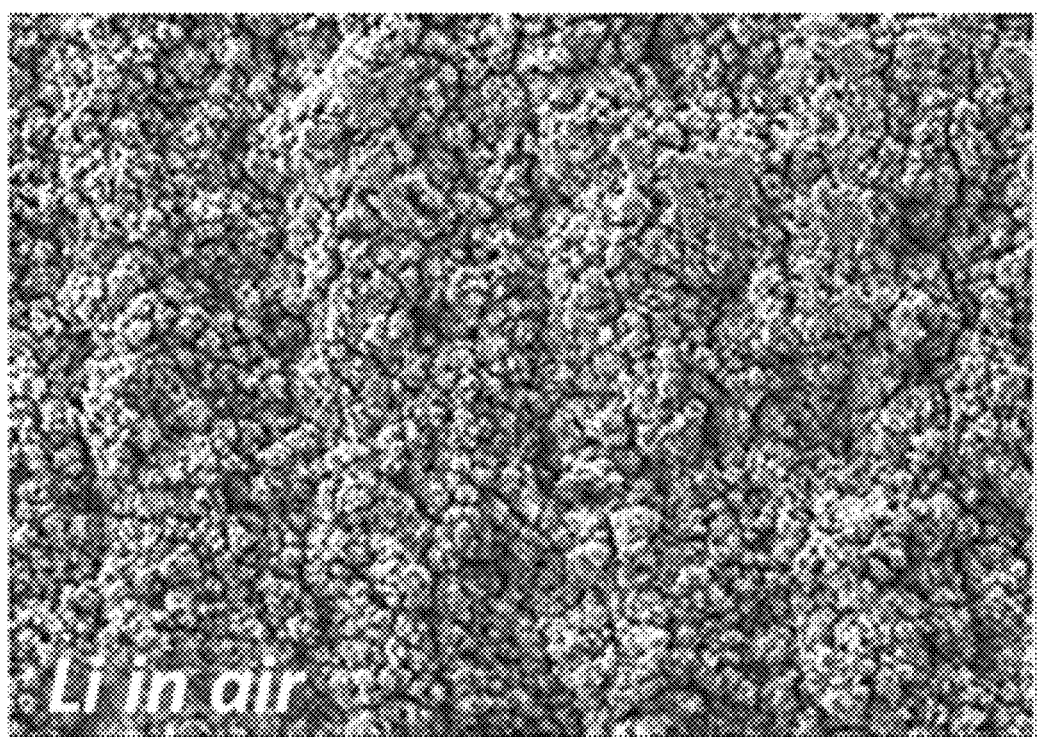
Figure 4F:
Figure 4G:
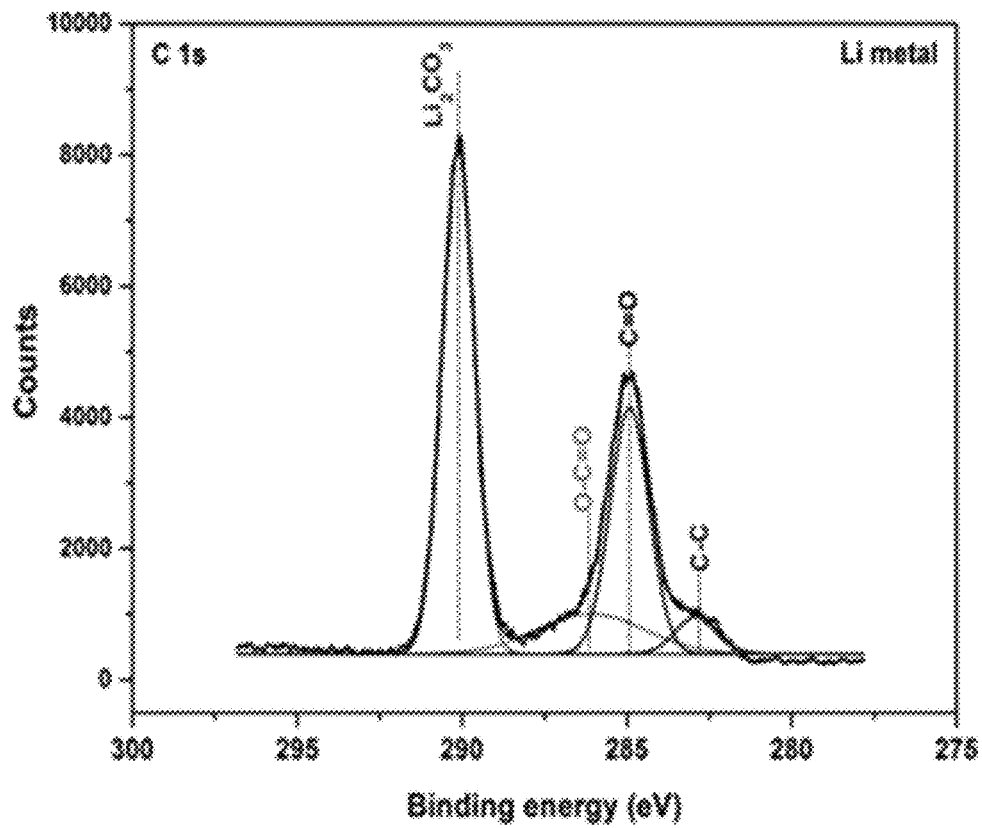
Figure 4H:
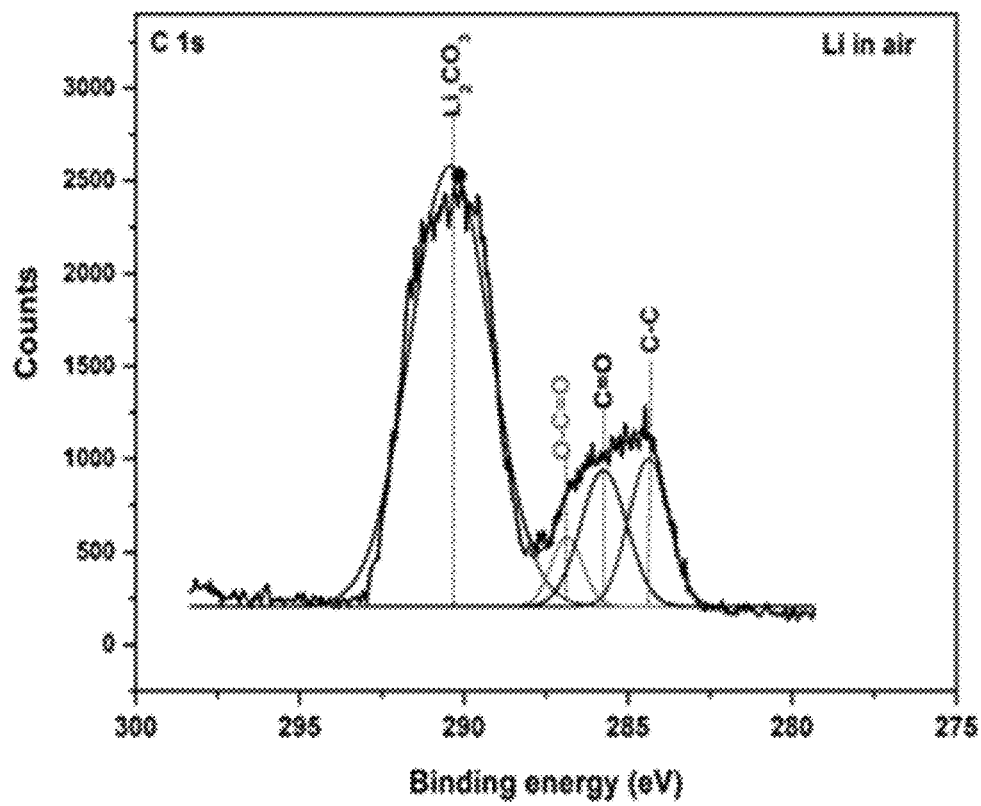

Specifically, referring to FIGS. 4D and 4E, it may be identified that the passive layer is formed on the surface of the lithium metal, resulting in the rough surface. The constituent elements may be identified based on in FIGS. 4G and 4H.

Figure 4I:
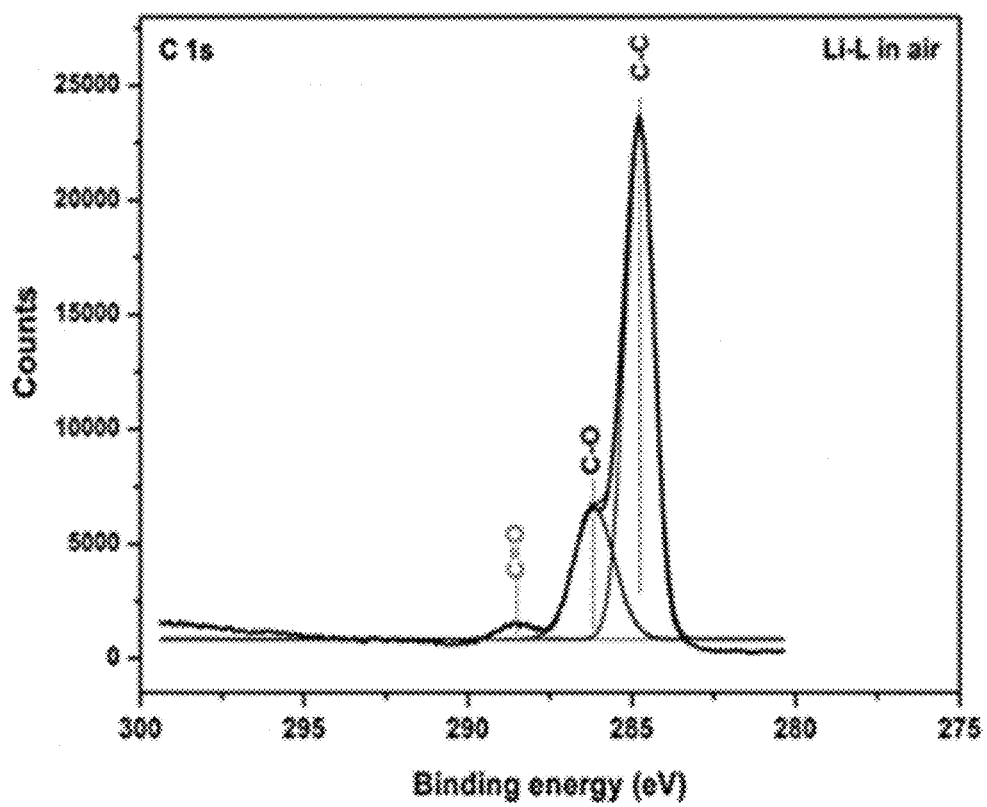

However, referring to FIG. 4I showing the XPS spectrum of Present Example 1, a peak of the passive layer did not occur. It may be seen based on this fact that the protective layer effectively contributes to preventing the oxidation of lithium metal in the air.

To identify the stability of the lithium metal (Comparative Example) and the protective layer-coated lithium metal (Present Example 1) in the liquid electrolyte, surface morphology and composition after the lithium metal (Comparative Example) and the protective layer-coated lithium metal (Present Example 1) were immersed in the liquid electrolyte were analyzed (see FIG. 5A-5F). Surface morphology was analyzed using AFM and FE-SEM, and composition analysis was conducted using XPS analysis.

Figure 5A:
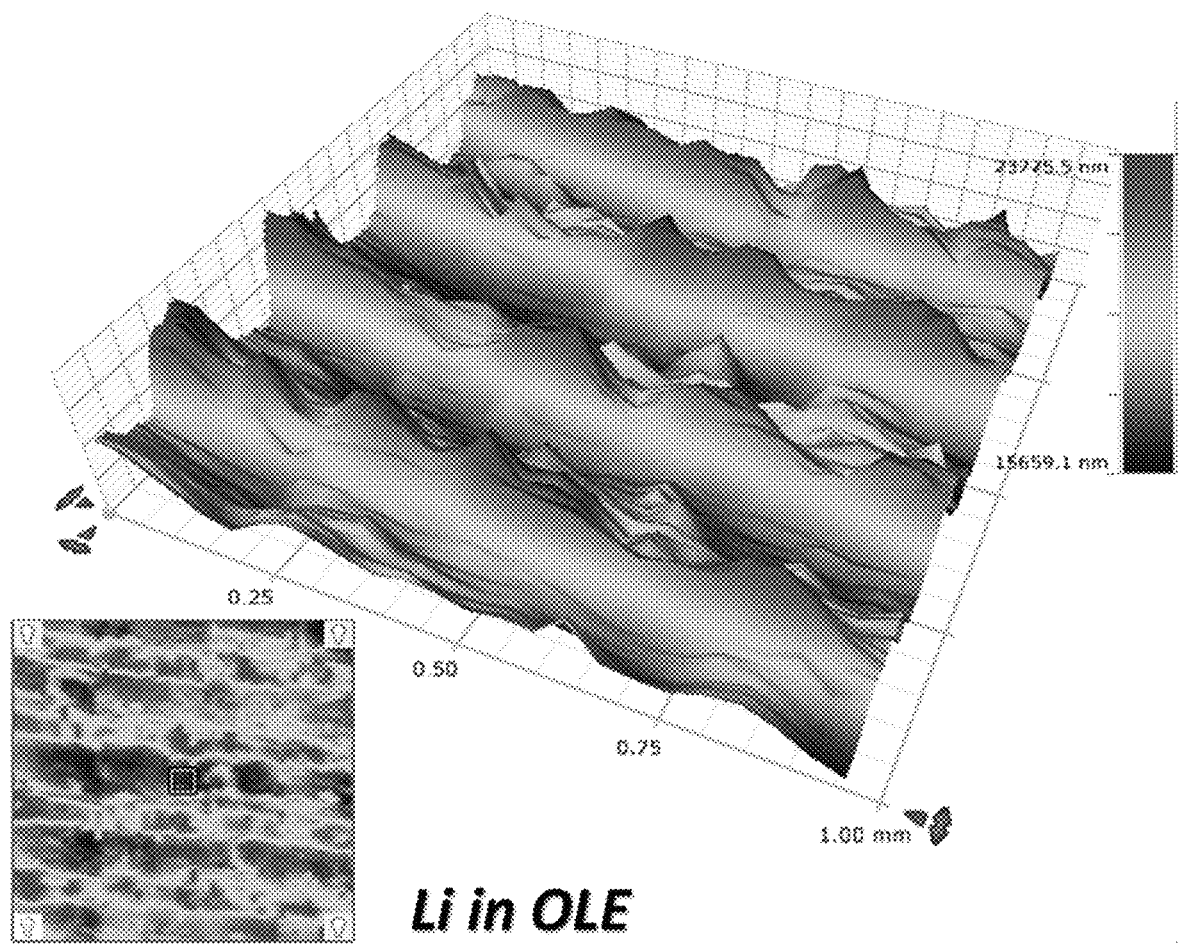
FIG. 5A to 5F show results of analysis of a surface morphology and a composition of bare lithium metal, and protective layer-coated lithium metal after immersion thereof in liquid electrolyte.
Figure 5B:
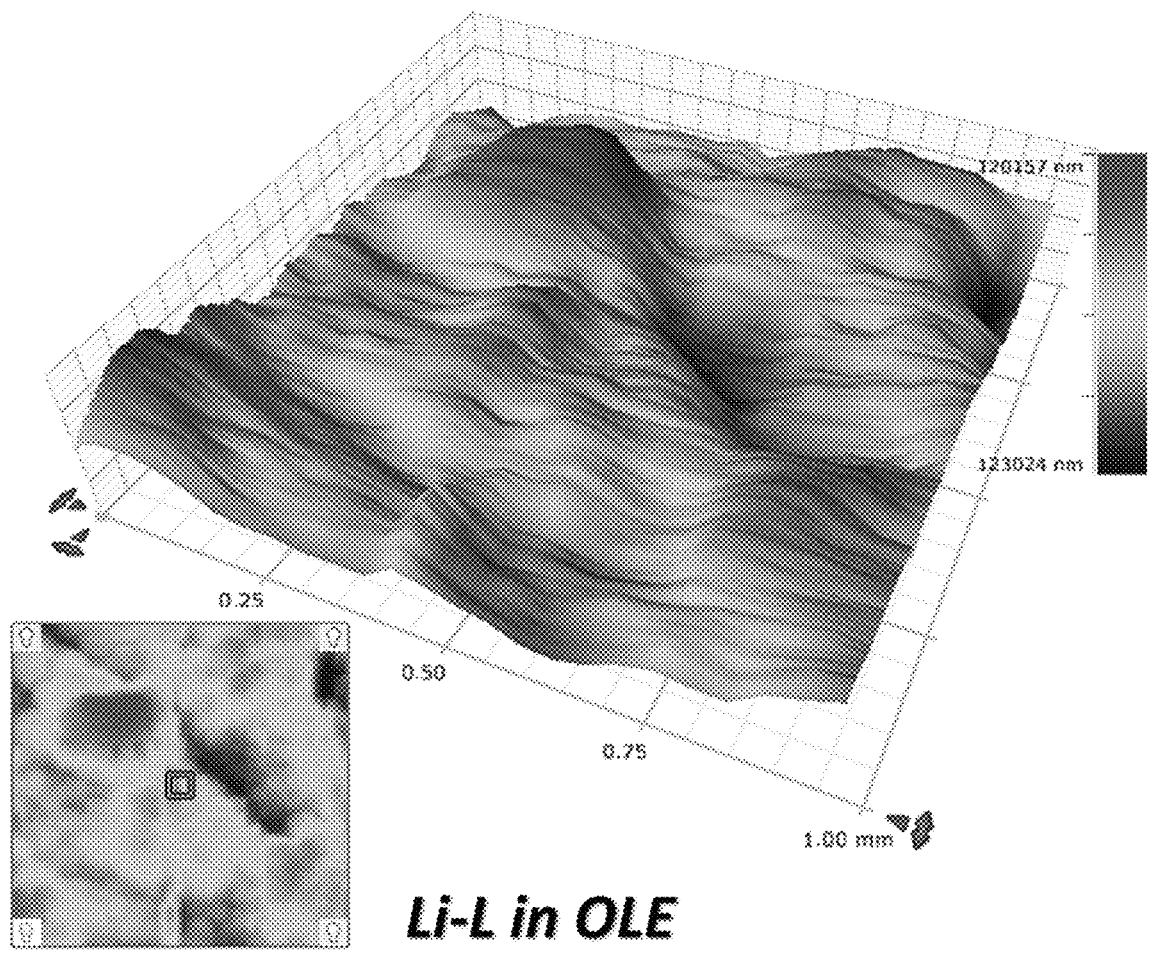
Figure 5C:
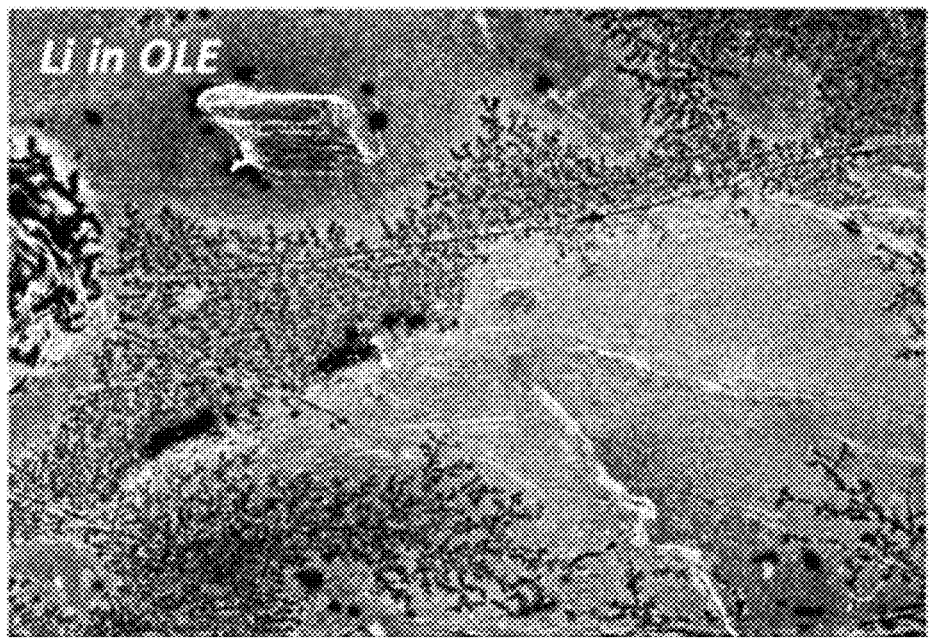
Figure 5D:
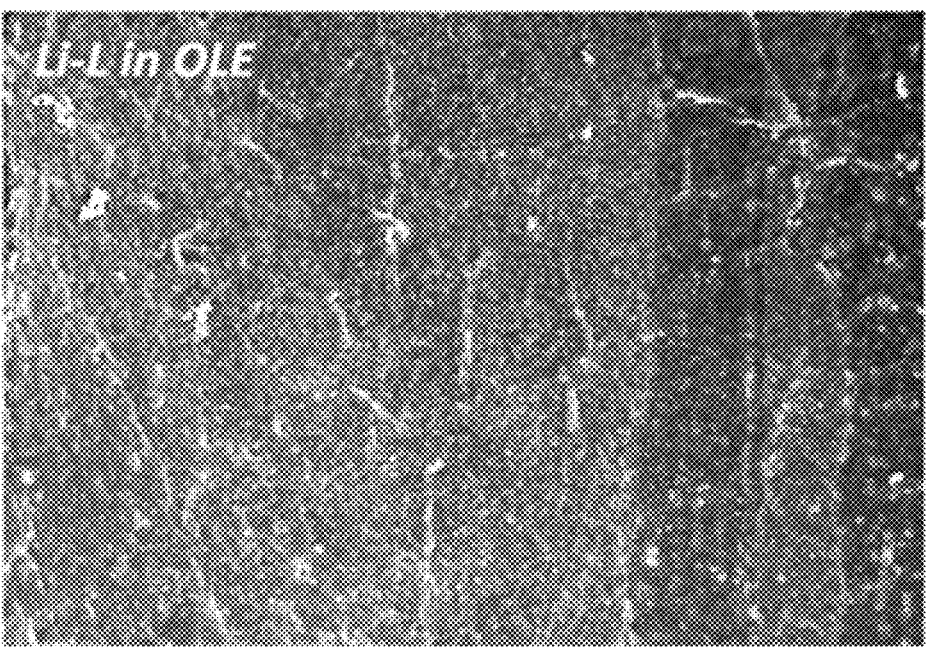
Figure 5E:
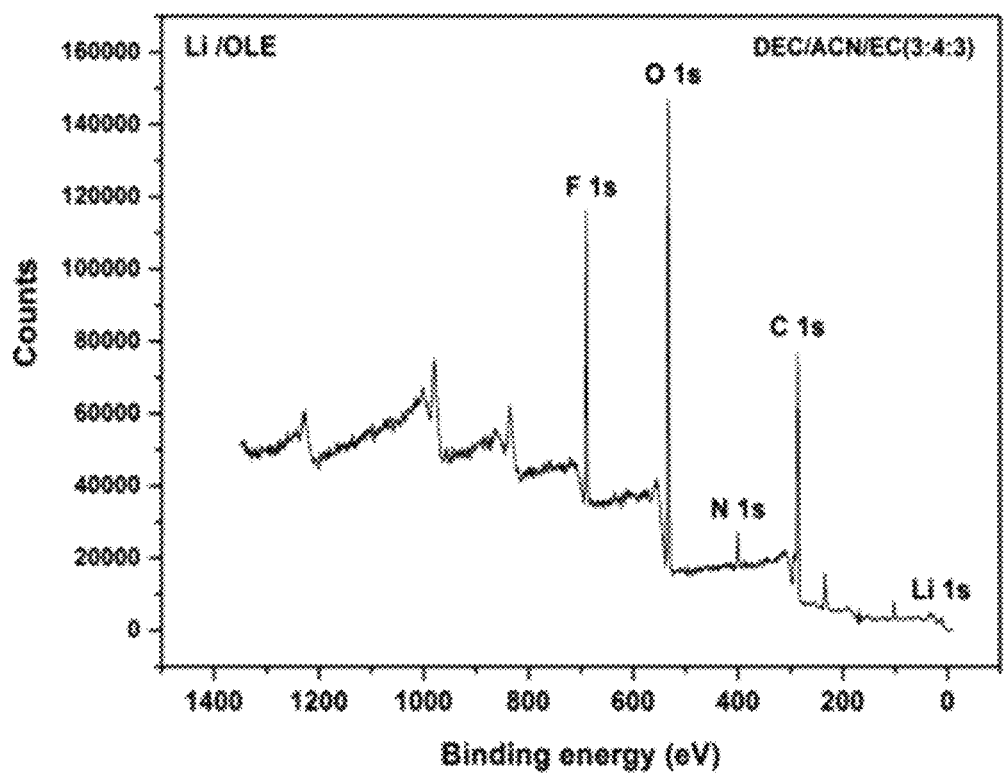
Figure 5F:
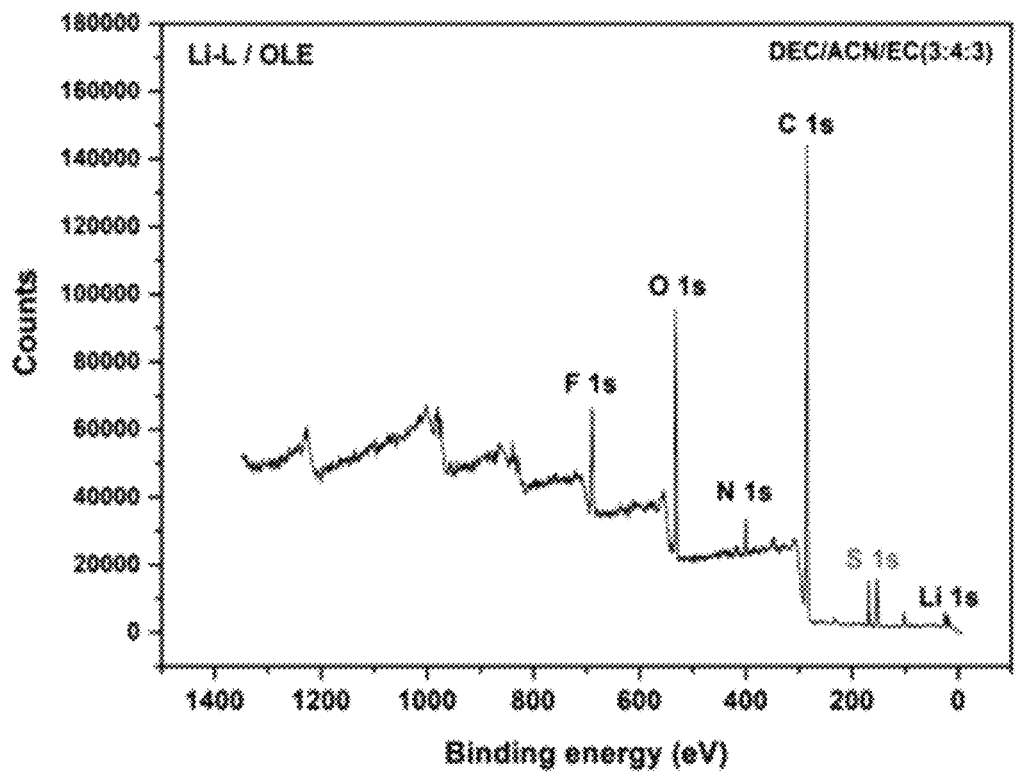

When comparing FIGS. 5A and 5B with each other, it may be seen that the surface of the lithium metal after being immersed in the liquid electrolyte was rougher than the surface of the lithium metal having the protective layer coated thereon (Present Example 1) after being immersed in the liquid electrolyte was. This is because a sharp surface layer was formed in the surface of the lithium metal as may be seen from FIG. 5C.

The surface layer is composed of lithium pentafluoro phosphate ($LiPF_5$), lithium fluoride (LiF), and lithium ethylene carbonate and is produced via a side reaction of lithium metal and liquid electrolyte. This may be seen based on increase in an intensity of a F peak in the XPS spectrum (see FIG. 5E).

To the contrary, in Present Example 1, the intensity of the peak F in the XPS spectrum (FIG. 5F) is lower than that in the Comparative Example. Thus, it may be identified that the PAES-g-PEG protective layer effectively prevents the growth of lithium dendrites.

Figure 6:
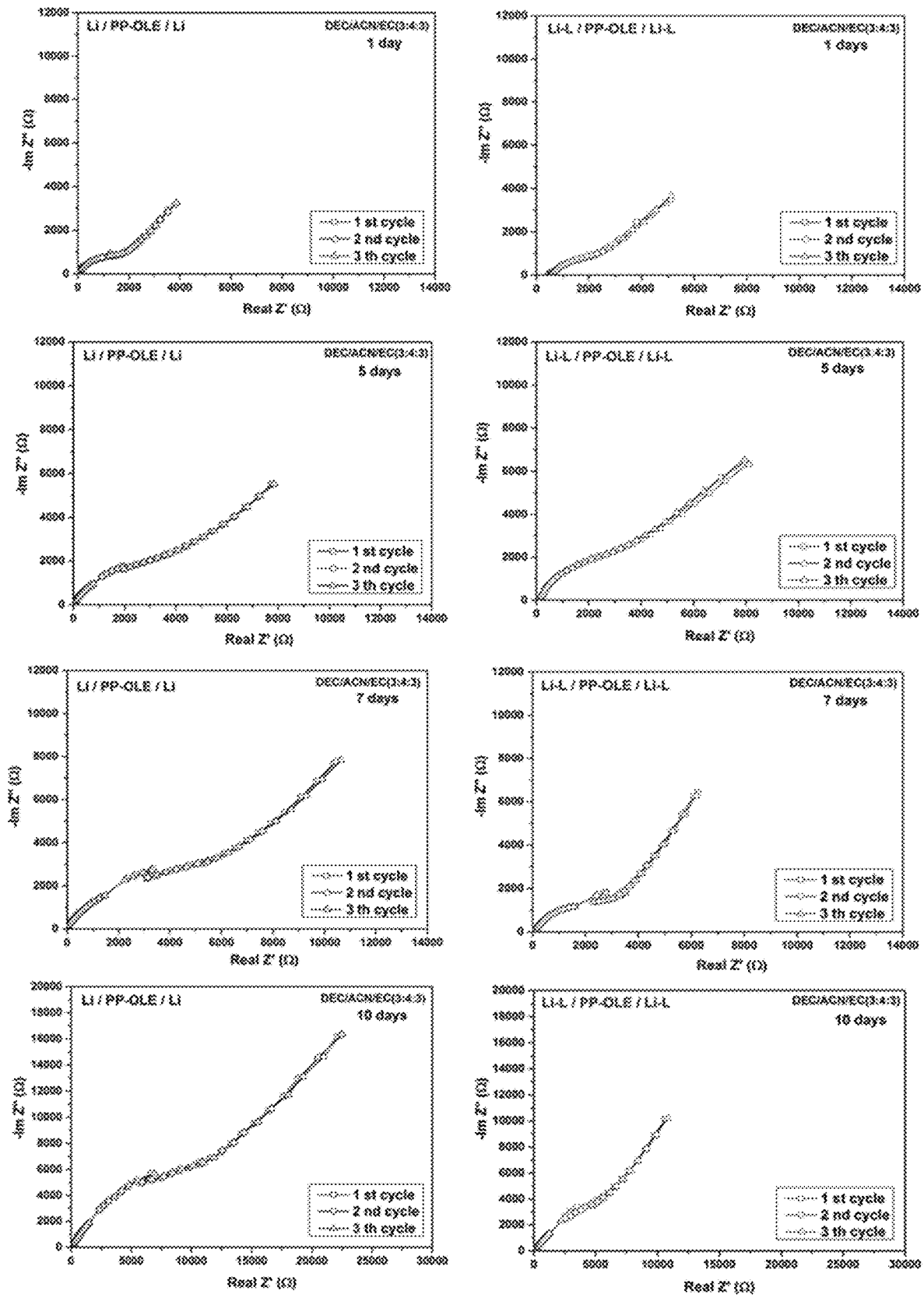
FIG. 6 shows results of measuring a change in an interfacial resistance of a protective layer-coated lithium metal after immersion thereof in liquid electrolyte for 10 days.

To identify the chemical stability between the PAES-g-PEG protective layer (Present Example 1) and 1M LiTFSI EC/ACN/DEC liquid electrolyte (Present Example 2a), changes in interfacial resistance were measured for 10 days, and the results are shown in FIG. 6.

As shown in FIG. 6, the interfacial resistance of the lithium metal (Comparative Example) without the protective layer coated thereon changed in a large amount. The interfacial resistance of the lithium metal having the protective layer coated thereon did not change significantly as opposed to that of the lithium metal without the protective layer coated thereon. This is because a dendrite layer made of the lithium salt is formed on the surface of the lithium metal without the protective layer coated thereon.

Performance Evaluation of Lithium-Ion Battery

To evaluate the performance of the lithium ion battery including the protective layer, galvanostatic charge/discharge experiments and cyclic voltammetry were performed to evaluate the discharge capacity and the cycle performance of each of LiNMCo/PP/Li-L cells and LiNMCo/PP/Li cells. Then, the discharge capacity and the cycle performance of LiNMCo/PP/Li-L cells were compared with those of LiNMCo/PP/Li cells (see FIG. 7A-7C).

Figure 7A:
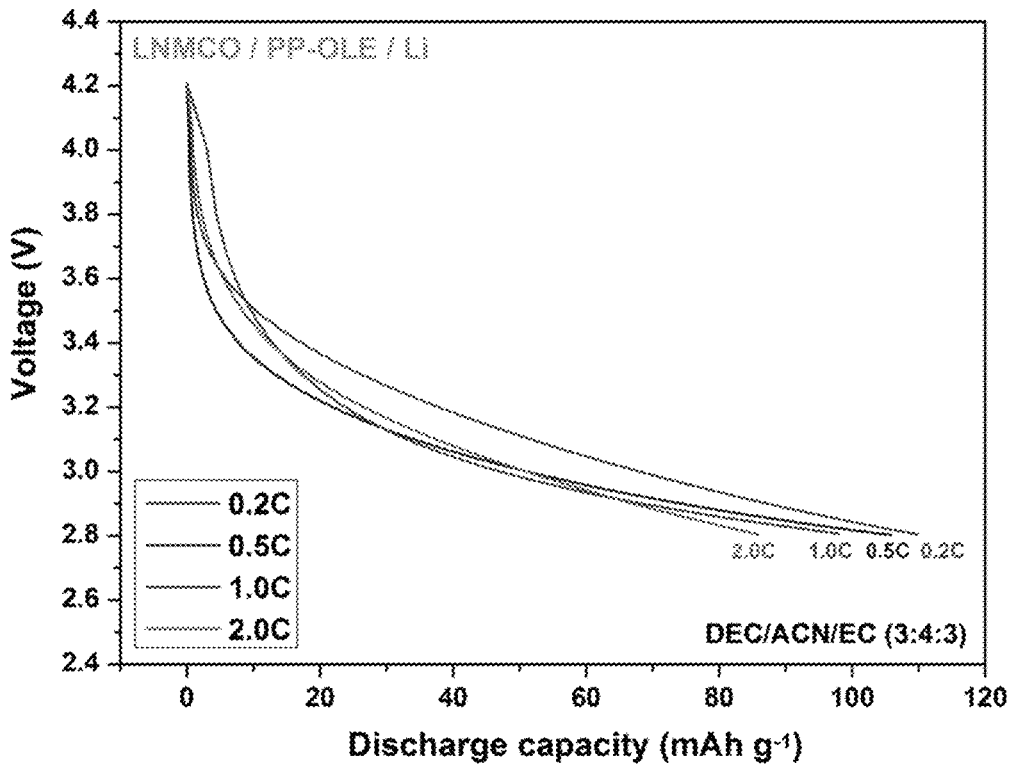
FIG. 7A to 7C show results of measuring discharge capacity and cycle performance of each of a LiNMCo/PP/Li-L cell containing a protective layer according to a Present Example and a LiNMCo/PP/Li cell as a Comparative Example.
Figure 7B:
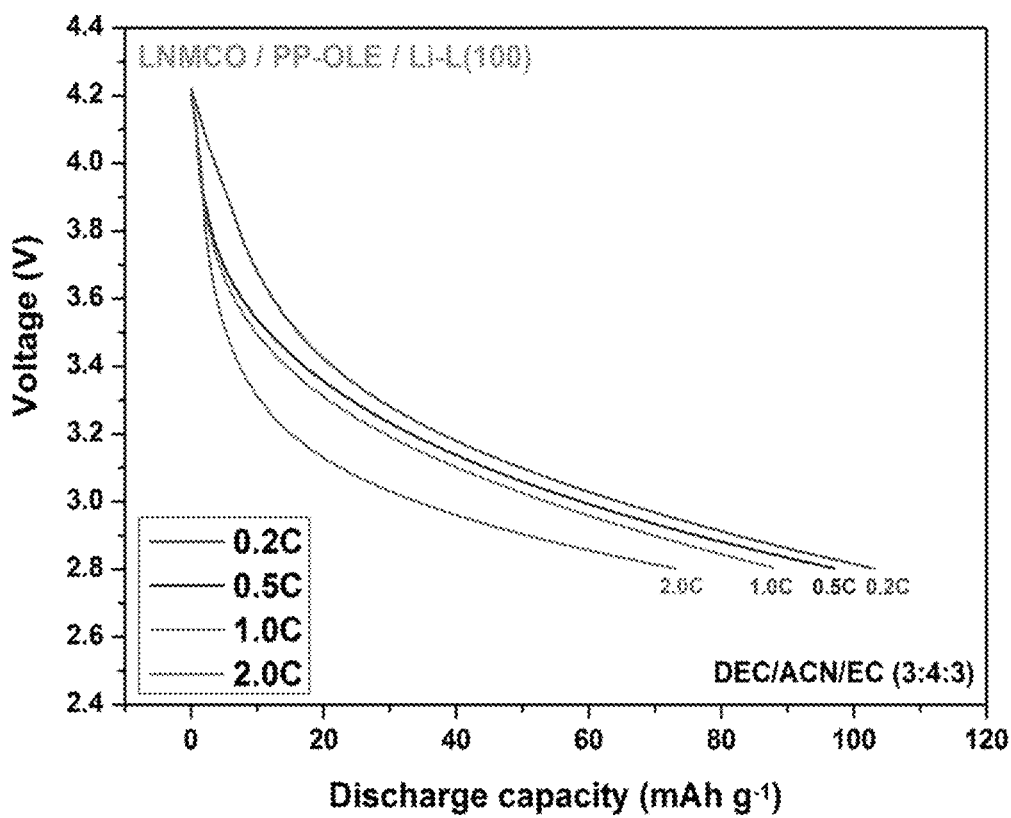
Figure 7C:
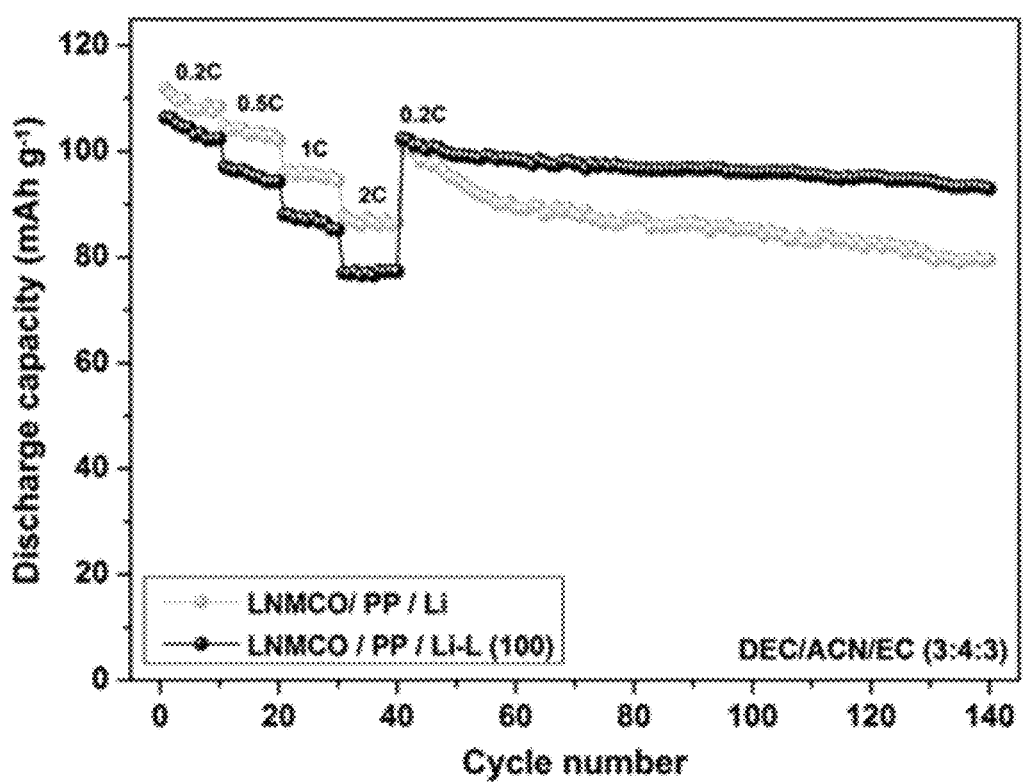

Referring to FIGS. 7A and 7B, the discharge capacity of LiNMCo/PP/Li-L cells is slightly smaller than that of LiNMCo/PP/Li cells. This may be due to the resistance of the PAES-g-PEG protective layer. Further, it may be seen from FIG. 7C that the LiNMCo/PP/Li cell has a higher specific capacity than that of the LiNMCo/PP/Li-L cell at various C-rates.

However, it may be seen that the discharge capacity of the LiNNMCo/PP/Li cell decreases greatly as the number of cycles increases, at 0.2 C where an unstable layer is formed on a surface of the lithium metal in the liquid electrolyte, and thus lithium dendrites are likely to occur.

To the contrary, the LiNMCo/PP/Li-L cell having the protective layer coated thereon in accordance with Present Example 1 is more stable than the Comparative Example. The discharge capacity of the former was maintained at 98 mAh/g which was 96% of an initial discharge capacity.

Therefore, when the protective layer according to the Present Example of the present disclosure is present on the lithium metal surface, the protective layer acts as a lithium ion receptor to efficiently transfer lithium ions from the positive electrode through the liquid electrolyte to the lithium metal negative-electrode, and to prevent the formation of lithium dendrites, thereby increasing the performance of the lithium secondary battery.

While the present disclosure has been described with reference to preferred embodiments, those skilled in the art will appreciate that the present disclosure may be variously modified and changed without departing from the spirit and scope of the present disclosure set forth in the following claims.

What is claimed is:

1. A method for synthesizing a poly(arylene ether sulfone)-poly(ethylene glycol) graft copolymer, the method comprising performing esterification reaction between a compound represented by a following Chemical Formula 1-1 and a compound represented a following Chemical Formula 1-2 to synthesize the poly(arylene ether sulfone)-poly(ethylene glycol) graft copolymer represented by a following Chemical Formula 1:

[Chemical Formula 1-1]
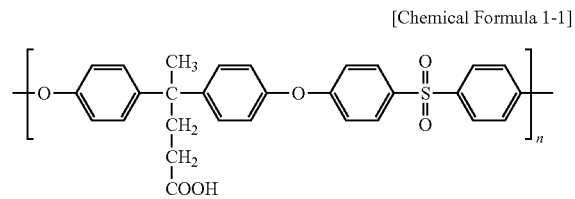

where, in the Chemical Formula 1-1, n is an integer of 60 to 80,

[Chemical Formula 1-2]
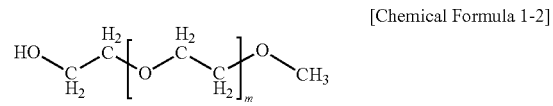

where, the Chemical Formula 1-2, m is an integer of 40 to 45,

[Chemical Formula 1]

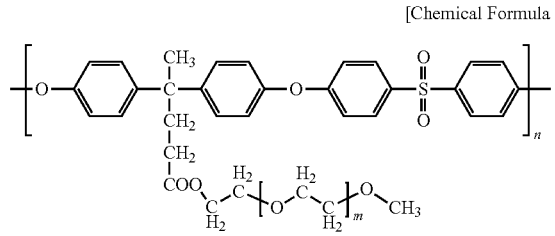

where, in the Chemical Formula 1, n is an integer of 60 to 80, and m is an integer of 40 to 45.

2. The method of claim 1, wherein the esterification reaction is carried out under presence of 4-dimethylaminopyridine (DMAP) and N,N'-dicyclohexylcarbodiimide (DCC).

3. The method of claim 1, wherein the esterification reaction is carried out at a temperature of 60 to 100° C. in a dimethylformamide (DMF) solvent.

4. A protective layer for protecting a lithium metal negative electrode for a lithium secondary battery, the protective layer containing a poly(arylene ether sulfone)-poly(ethylene glycol) graft copolymer represented by a following Chemical Formula 1:

[Chemical Formula 1]

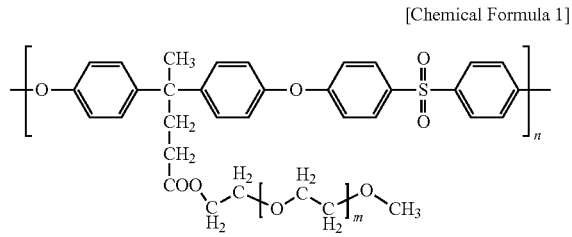

where, in the Chemical Formula 1, n is an integer of 60 to 80, and m is an integer of 40 to 45.

5. The protective layer of claim 4, wherein the protective layer is formed on a lithium metal surface,
wherein an ion conductivity of the protective layer is $0.27 \times 10^{-3}$ S/cm or greater,
wherein a liquid electrolyte uptake of the protective layer is 55% or greater.

6. The protective layer of claim 5, wherein the protective layer has a tensile strength of 2.0 MPa or greater and a break elongation of 60% or greater.

7. The protective layer of claim 5, wherein a thermal decomposition temperature (Td) of the protective layer is 200° C. or higher.

8. The protective layer of claim 5, wherein the liquid electrolyte contains:
a lithium salt; and
at least one organic solvent selected from ethylene carbonate (EC), acetonitrile (ACN) and diethyl carbonate (DEC).

9. The protective layer of claim 8, wherein the liquid electrolyte contains ethylene carbonate (EC), acetonitrile (ACN) and diethyl carbonate (DEC) as the organic solvent,
wherein the liquid electrolyte contains ethylene carbonate (EC), acetonitrile (ACN) and diethyl carbonate (DEC) in a volume ratio of 3:3.5 to 4.5:2.5 to 3.5.

10. The protective layer of claim 8, wherein the lithium salt includes lithium bis(trifluoromethanesulfonyl) (LITFSI).

11. A method for producing a protective layer for protecting a lithium metal negative electrode for a lithium secondary battery, the method comprising:
dissolving a poly(arylene ether sulfone)-poly(ethylene glycol) graft copolymer represented by a following Chemical Formula 1 into a solvent to prepare a first solution; and
applying the first solution to a lithium metal surface under argon gas,

[Chemical Formula 1]

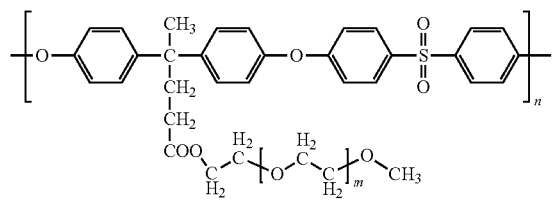

where, in the Chemical Formula 1, n is an integer of 60 to 80, and m is an integer of 40 to 45.

12. The method of claim 11, wherein the solvent includes tetrahydrofuran (THF).

13. A lithium secondary battery comprising a positive-electrode; a negative-electrode; and a liquid electrolyte,
wherein the negative-electrode includes lithium metal,
wherein the lithium secondary battery further comprises the protective layer of claim 4 formed on a surface of the lithium metal of the negative-electrode.

14. The lithium secondary battery of claim 13, wherein the liquid electrolyte contains:
lithium bis(trifluoromethanesulfonyl) (LITFSI) as a lithium salt; and
ethylene carbonate (EC), acetonitrile (ACN) and diethyl carbonate (DEC) as an organic solvent,
wherein the liquid electrolyte contains ethylene carbonate (EC), acetonitrile (ACN) and diethyl carbonate (DEC) in a volume ratio of 3:3.5 to 4.5:2.5 to 3.5.

* * * * *